US012212045B2

(12) United States Patent
Lee et al.

(10) Patent No.: US 12,212,045 B2
(45) Date of Patent: Jan. 28, 2025

(54) ANTENNA AND ELECTRONIC DEVICE COMPRISING SAME

(71) Applicant: SAMSUNG ELECTRONICS CO., LTD., Suwon-si (KR)

(72) Inventors: Yousung Lee, Suwon-si (KR); Dongil Yang, Suwon-si (KR); Hyoseok Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 121 days.

(21) Appl. No.: 18/075,815

(22) Filed: Dec. 6, 2022

(65) Prior Publication Data

US 2023/0111747 A1 Apr. 13, 2023

Related U.S. Application Data

(63) Continuation of application No. PCT/KR2021/006307, filed on May 20, 2021.

(30) Foreign Application Priority Data

Jul. 13, 2020 (KR) ........................ 10-2020-0085877

(51) Int. Cl.
*H01Q 1/24* (2006.01)
*H01Q 1/38* (2006.01)
*H01Q 1/52* (2006.01)

(52) U.S. Cl.
CPC ............... *H01Q 1/243* (2013.01); *H01Q 1/38* (2013.01); *H01Q 1/526* (2013.01)

(58) Field of Classification Search
CPC ............ H01Q 1/24; H01Q 1/243; H01Q 1/22; H01Q 1/2283; H01Q 1/38; H01Q 1/52;
(Continued)

(56) References Cited

U.S. PATENT DOCUMENTS 7,557,758 B2 7/2009 Rofougaran
7,714,780 B2 5/2010 Rofougaran
(Continued)

FOREIGN PATENT DOCUMENTS

KR 10-2008-0063211 7/2008
KR 10-2009-0063166 6/2009
(Continued)

OTHER PUBLICATIONS

Partial Supplementary European Search Report dated Oct. 12, 2023 issued in European Patent Application No. 21842754.0.
(Continued)

*Primary Examiner* — Tho G Phan
(74) *Attorney, Agent, or Firm* — Nixon & Vanderhye, P.C.

(57) ABSTRACT

An electronic device comprises: a housing including a front plate, a rear plate, and side portions surrounding a space formed by the front plate and the rear plate; a display visible through the front plate; and an antenna module disposed in the space, wherein the antenna module comprises: a printed circuit board (PCB) including a first surface facing a first direction and a second surface facing a second direction opposite to the first direction; at least one first antenna disposed on the first surface of the PCB; an IC chip disposed on the second surface of the PCB; an insulation member comprising an insulating material covering at least a portion of the IC chip; and a second antenna disposed on a surface of the insulation member facing the second direction, wherein the IC chip may be configured to feed the first antenna, the first antenna may be configured to radiate a first signal of a first frequency band, and the second antenna may be configured to radiate a second signal.

21 Claims, 16 Drawing Sheets

(58) Field of Classification Search
CPC ........ H01Q 1/526; H01Q 9/04; H01Q 9/0435; H01Q 21/00; H01Q 21/06; H01Q 21/28; H01Q 21/30; H01Q 25/00; H01Q 25/005
See application file for complete search history.

(56) References Cited

U.S. PATENT DOCUMENTS 7,880,677 B2 2/2011 Rofougaran et al.
7,944,038 B2 5/2011 Chiu et al.
8,199,060 B2 1/2012 Rofougaran et al.
8,466,840 B2 * 6/2013 Hung ..................... H01Q 21/28 343/702
8,497,805 B2 7/2013 Rofougaran et al.
9,245,858 B2 1/2016 Han et al.
9,667,290 B2 5/2017 Ouyang et al.
10,084,490 B2 9/2018 Ouyang et al.
10,170,838 B2 1/2019 Garcia et al.
10,186,756 B2 1/2019 Dalmia
10,431,892 B2 10/2019 Garcia et al.
11,005,155 B2 5/2021 Khan et al.
11,011,828 B2 * 5/2021 Park ........................ H01Q 1/243
11,038,264 B2 6/2021 Son et al.
11,069,956 B2 7/2021 Kim et al.
11,108,164 B2 8/2021 Yong et al.
11,183,747 B2 11/2021 Moon et al.
11,228,120 B2 1/2022 Song et al.
11,276,916 B2 * 3/2022 Kim ........................ H01Q 1/243
11,356,131 B2 6/2022 Ouyang et al.
11,581,627 B2 * 2/2023 Yoo ........................ H01Q 1/243
11,616,288 B2 3/2023 Kim et al.
11,652,301 B2 5/2023 Yang et al.
11,881,617 B2 * 1/2024 Kim ......................... H04B 1/40
2009/0102579 A1 4/2009 Rofougaran
2009/0184882 A1 7/2009 Jow
2009/0289343 A1 11/2009 Chiu et al.
2013/0015544 A1 1/2013 Han et al.
2015/0070228 A1 3/2015 Gu et al.
2015/0243881 A1 8/2015 Sankman et al.
2016/0056544 A1 2/2016 Garcia et al.
2016/0126200 A1 5/2016 Han et al.
2016/0172761 A1 6/2016 Garcia et al.
2018/0034134 A1 2/2018 Dalmia
2019/0020365 A1 1/2019 Ouyang et al.
2019/0280368 A1 9/2019 Khan et al.
2019/0319364 A1 10/2019 Yang et al.
2020/0021016 A1 1/2020 Son et al.
2020/0036083 A1 1/2020 Kim et al.
2020/0052416 A1 2/2020 Yong et al.
2020/0212584 A1 7/2020 Park et al.
2021/0305694 A1 9/2021 Kim et al.
2022/0085490 A1 3/2022 Moon et al.
2023/0238686 A1 7/2023 Kim et al.
2023/0261393 A1 8/2023 Yang et al.

FOREIGN PATENT DOCUMENTS

KR 10-2012-0043503 5/2012
KR 10-1677270 11/2016
KR 2019-0103677 9/2019
KR 10-2020-0008408 1/2020
KR 10-2020-0014601 2/2020
KR 10-2020-0024408 3/2020
KR 10-2020-0038034 4/2020
KR 10-2020-0061935 6/2020
KR 10-2020-0081760 7/2020

OTHER PUBLICATIONS

Extended European Search Report dated Feb. 6, 2024 issued in European Patent Application No. 21842754.0.
Office Action dated May 2, 2024 in Korean Patent Application No. 10-2020-0085877 and English-language translation.

* cited by examiner

ANTENNA AND ELECTRONIC DEVICE COMPRISING SAME

CROSS-REFERENCE TO RELATED APPLICATIONS

This application is a continuation of International Application No. PCT/KR2021/006307, designating the United States, filed on May 20, 2021, in the Korean Intellectual Property Receiving Office and claiming priority to Korean Patent Application No. 10-2020-0085877, filed on Jul. 13, 2020, in the Korean Intellectual Property Office, the disclosures of which are incorporated by reference herein in their entireties.

BACKGROUND

Field

The disclosure relates to an antenna and an electronic device including the same.

Description of Related Art

Due to development of mobile communication technologies, electronic devices including at least one antenna have been widely distributed. The electronic device may transmit and/or receive a radio frequency (RF) signal including a voice signal or data (e.g., a message, a picture, a video, a music file, or a game) using an antenna for wireless communication.

An antenna may use a plurality of frequency bands. The antenna may have a plurality of RF bands that support wireless communication. The antenna may service a global communication band using signals pertaining to different frequency bands. For example, the antenna may perform communication (e.g., a global positioning system (GPS), Legacy, and Wifi1) that uses signals pertaining to a low frequency band (LB), and/or communication (e.g., Wifi2) that uses signals pertaining to a high frequency band (HB).

Meanwhile, as a next-generation (e.g., a fifth generation (5G)) communication is introduced, the electronic device may support frequency bands, such as millimeter wave (mmWave) and/or sub6 (e.g., n78 and n79). The electronic device may include an antenna for supporting new frequency bands. The electronic device may include an antenna for various connectivity functions, such as Wi-Fi, near field communication (NFC), or an ultra wide band (UWB).

As one example for providing an antenna to an electronic device, an antenna and a board may be implemented in one package by disposing the antenna in a fan-out area of a PCB in a fan-out wafer level package (FOWLP) structure and disposing an integrated circuit (IC) chip in a fan-in area. In this case, because the antenna is disposed in the fan-out area, it may be difficult to use pins that cannot be used in the fan-in area, in the fan-out area. Furthermore, in this case, because the antenna may be disposed only in the fan-out area, radiation performance may be limited and a space for implementing the antenna may be restricted, whereby only a high frequency signal having a short wavelength of an RF signal radiated may be supported.

As another example for providing an antenna to an electronic device, an IC chip may be disposed on a bottom surface of a PCB included in an antenna module and the antenna may be disposed on a top surface thereof. In this case, a separate PCB that connects the PCB and the antenna is necessary whereby a thickness of the antenna module may become larger. Furthermore, an antenna may be implemented in an outer area of the PCB whereby a size of the antenna module may become larger.

SUMMARY

Embodiments of the disclosure provide a structure, in which an area, in which an antenna is to be disposed in an FOWLP structure, is increased, and an electronic device including the same.

According to an example embodiment disclosed in the disclosure, an electronic device includes: a housing including a front plate, a rear plate, and a side portion surrounding a space defined by the front plate and the rear plate, a display disposed under the front plate, and an antenna module disposed in the space, the antenna module including: a printed circuit board (PCB) including a first surface facing a first direction and a second surface facing a second direction opposite to the first direction, at least one first antenna disposed on the first surface of the PCB, an IC chip disposed on the second surface of the PCB, an insulation member comprising an insulating material covering at least a portion of the IC chip, and a second antenna disposed on a surface of the insulation member facing the second direction, and wherein the IC chip is configured to feed the first antenna, the first antenna is configured to radiate a first signal of a first frequency band, and the second antenna is configured to radiate a second signal.

According to an example embodiment disclosed in the disclosure, an electronic device includes: a housing including a front plate, a rear plate, and a side portion, a display disposed under the front plate, a support connected to the side portion of the housing, and an antenna module disposed in the side portion and/or the support, the antenna module including: a printed circuit board (PCB) including a first surface facing a first direction and a second surface facing a second direction opposite to the first direction, at least one first antenna disposed on the first surface of the PCB, an IC chip disposed on the second surface of the PCB, a first insulation member comprising an insulating material covering the IC chip, a shielding member comprising a conductive material disposed on a surface of the first insulation member facing the second direction, and having a conductivity, a second insulation member comprising an insulating material covering the shielding member, and a second antenna disposed on a surface of the second insulation member facing the second direction, and wherein the IC chip is configured to feed the first antenna, and the first antenna is configured to radiate a first signal of a first frequency band, and the second antenna is configured to radiate a second signal.

According to an example embodiment disclosed in the disclosure, an antenna module includes: a printed circuit board (PCB) including a first surface facing a first direction and a second surface facing a second direction opposite to the first direction, at least one first antenna disposed on the first surface of the PCB, an IC chip disposed on the second surface of the PCB, an insulation member comprising an insulating material covering the IC chip, and a second antenna disposed on a surface of the insulation member facing the second direction, and wherein the IC chip is configured to feed the first antenna, the first antenna is configured to radiate a first signal of a first frequency band, and the second antenna is configured to radiate a second signal.

According to various example embodiments disclosed in the disclosure, because the antenna may be disposed while at least a portion of the IC chip is covered by the insulation member, a disposition area of the antenna may be increased. A radiation performance may be enhanced and a frequency range of an RF signal may be increased by increasing the disposition area of the antenna.

Furthermore, according to various example embodiments disclosed in the disclosure, the antenna may be disposed on the first surface of the PCB, the IC chip disposed on the second surface may be covered by the insulation member, and the second antenna may be disposed in the insulation member. A radiation performance may be enhanced or RF signals of different frequency bands may be radiated by disposing the antennas on opposite surfaces of the PCB.

In addition, according to various example embodiments disclosed in the disclosure, electromagnetic interferences (EMIs) of the board may be shielded and heat generated in the board may be dissipated by disposing the shielding member between the first insulation member and the second insulation member.

In addition, the disclosure may provide various effects that are directly or indirectly recognized.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of drawings, the same or similar components may be marked by the same or similar reference numerals.

DETAILED DESCRIPTION

Hereinafter, various example embodiments of the disclosure will be described with reference to the accompanying drawings. Accordingly, those of ordinary skill in the art will recognize that modifications, equivalents, and/or alternatives of the various example embodiments described herein can be variously made without departing from the scope and spirit of the disclosure.

Figure 1:
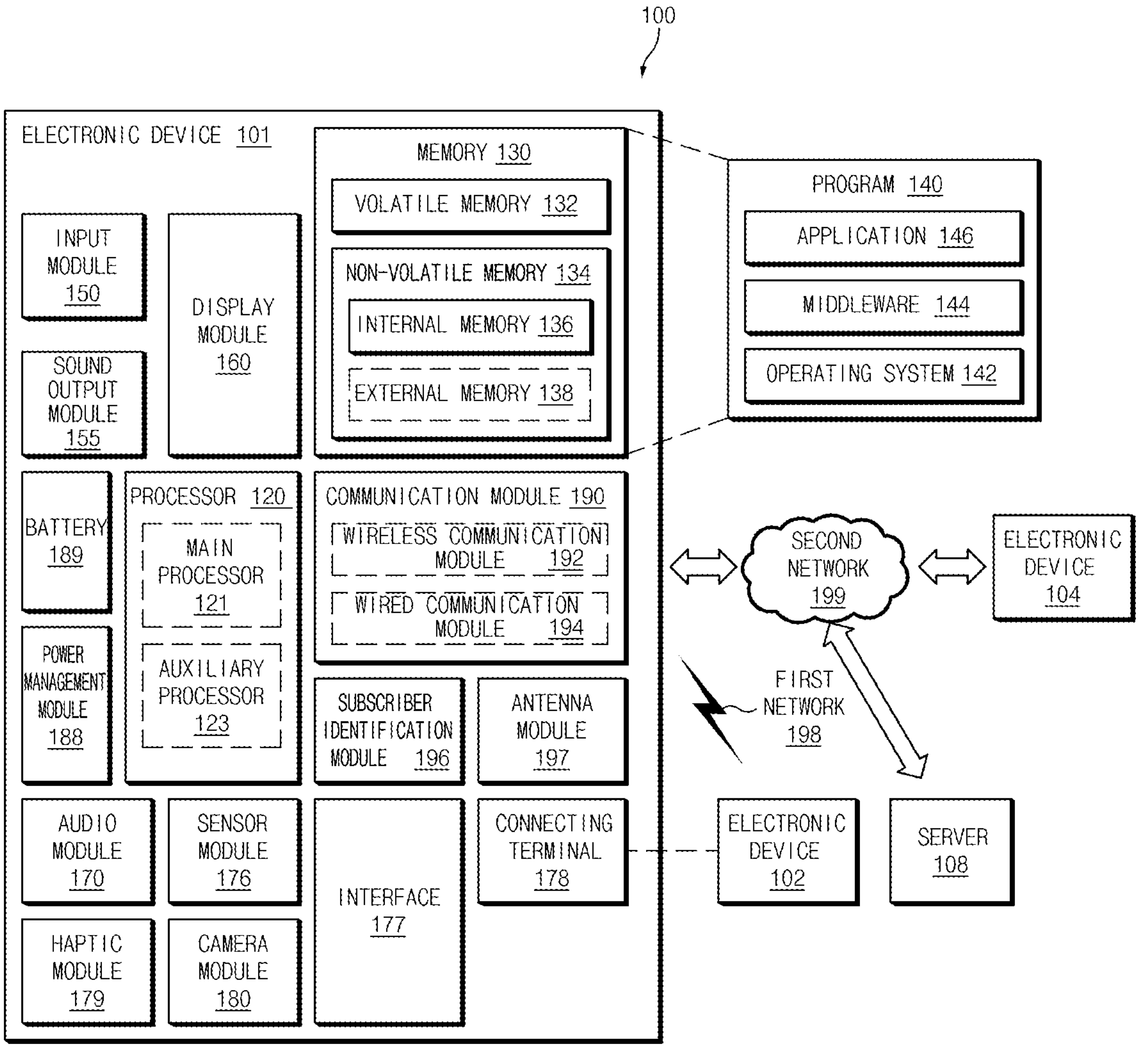
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
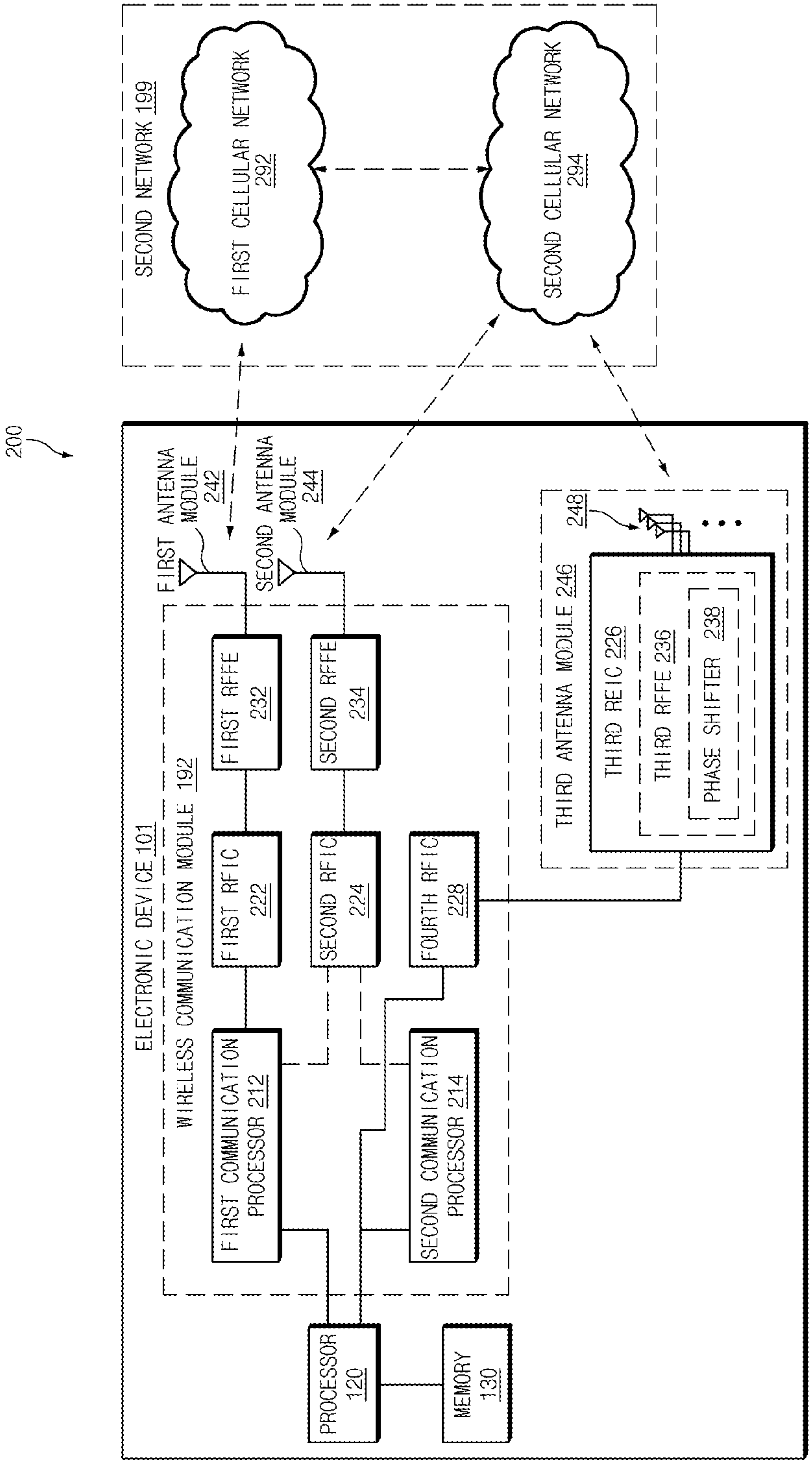
FIG. 2 is a block diagram illustrating an example configuration of an electronic device for supporting a legacy network communication and a 5G network communication according to various embodiments.

FIG. 2 is a block diagram 200 illustrating an example configuration of an electronic device 101 for supporting legacy network communication and 5G network communication according to various embodiments. Referring to FIG. 2, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to an embodiment, the electronic device 101 may further include at least one component of the components illustrated in FIG. 1, and the second network 199 may further include at least another network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to an embodiment, the fourth RFIC 228 may be omitted or may be included as a part of the third RFIC 226.

The first communication processor 212 may include various processing circuitry and establish a communication channel for a band to be used for wireless communication with the first cellular network 292 and may support legacy network communication through the established communication channel. According to various embodiments, the first cellular network 292 may be a legacy network including a 2nd generation (2G), 3G, 4G, or long term evolution (LTE) network. The second communication processor 214 may support establishment of a communication channel corresponding to a specified band (e.g., about 6 GHz to about 60 GHz) among bands to be used for wireless communication with the second cellular network 294 and may support 5G network communication via the established communication channel. According to various embodiments, the second cellular network 294 may be a 5G network defined in the 3GPP. Additionally, according to an embodiment, the first communication processor 212 or the second communication processor 214 may include various processing circuitry and establish a communication channel for a specified band (e.g., about 6 GHz or lower) of the bands to be used for wireless communication with the second cellular network 294 and may support 5G network communication through the established communication channel. According to an embodiment, the first communication processor 212 and the second communication processor 214 may be implemented in a single chip or a single package. According to various embodiments, the first communication processor 212 or the second communication processor 214 may be implemented in a single chip or a single package together with the processor 120, the auxiliary processor 123, or the communication module 190 of FIG. 1.

In the case of transmitting a signal, the first RFIC 222 may convert a baseband signal generated by the first communication processor 212 into a radio frequency (RF) signal of about 700 MHz to about 3 GHz that is used in the first cellular network 292. In the case of receiving a signal, an RF signal may be obtained from the first cellular network 292 (e.g., a legacy network) through an antenna (e.g., the first antenna module 242) and may be pre-processed through an RFFE (e.g., the first RFFE 232). The first RFIC 222 may convert the pre-processed RF signal into a baseband signal to be processed by the first communication processor 212.

In the case of transmitting a signal, the second RFIC 224 may convert a baseband signal generated by the first communication processor 212 or the second communication processor 214 into an RF signal (hereinafter referred to as a "5G Sub6 RF signal") in a Sub6 band (e.g., about 6 GHz or lower) used in the second cellular network 294 (e.g., a 5G network). In the case of receiving a signal, the 5G Sub6 RF signal may be obtained from the second cellular network 294 (e.g., a 5G network) through an antenna (e.g., the second antenna module 244) and may be preprocessed through an RFFE (e.g., the second RFFE 234). The second RFIC 224 may convert the pre-processed 5G Sub6 RF signal into a baseband signal to be processed by a corresponding communication processor of the first communication processor 212 or the second communication processor 214.

The third RFIC 226 may convert a baseband signal generated by the second communication processor 214 into an RF signal (hereinafter referred to as a "5G Above6 RF signal") in a 5G Above6 band (e.g., about 6 GHz to about 60 GHz) to be used in the second cellular network 294 (e.g., a 5G network). In the case of receiving a signal, the 5G Above6 RF signal may be obtained from the second cellular network 294 (e.g., a 5G network) through an antenna (e.g., the antenna 248) and may be pre-processed through a third RFFE 236. For example, the third RFFE 236 may perform pre-processing of a signal using a phase shifter 238. The third RFIC 226 may convert the pre-processed 5G Above6 RF signal into a baseband signal to be processed by the second communication processor 214. According to an embodiment, the third RFFE 236 may be implemented as a part of the third RFIC 226.

According to an embodiment, the electronic device 101 may include the fourth RFIC 228 independently of the third RFIC 226 or as at least a part of the third RFIC 226. In this case, the fourth RFIC 228 may convert a baseband signal generated by the second communication processor 214 into an RF signal (hereinafter referred to as an "intermediate frequency (IF) signal") in an intermediate frequency band (e.g., ranging from about 1 GHz to about 11 GHz) and may provide the IF signal to the third RFIC 226. The third RFIC 226 may convert the IF signal into the 5G Above6 RF signal. In the case of receiving a signal, the 5G Above6 RF signal may be received from the second cellular network 294 (e.g., a 5G network) through an antenna (e.g., the antenna 248) and may be converted into an IF signal by the third RFIC 226. The fourth RFIC 228 may convert the IF signal into a baseband signal to be processed by the second communication processor 214.

According to an embodiment, the first RFIC 222 and the second RFIC 224 may be implemented with a part of a single package or a single chip. According to an embodiment, the first RFFE 232 and the second RFFE 234 may be implemented as a part of a single package or a single chip. According to an embodiment, at least one of the first antenna module 242 or the second antenna module 244 may be omitted or may be combined with any other antenna module to process RF signals in a plurality of bands.

According to an embodiment, the third RFIC 226 and the antenna 248 may be disposed at the same substrate to form a third antenna module 246. For example, the wireless communication module 192 or the processor 120 may be disposed on a first substrate (e.g., a main PCB). In this case, the third RFIC 226 may be disposed in a partial region (e.g., on a lower surface) of a second substrate (e.g., a sub PCB) independent of the first substrate, and the antenna 248 may be disposed in another partial region (e.g., on an upper surface) of the second substrate. As such, the third antenna module 246 may be formed. According to an embodiment, the antenna 248 may include, for example, an antenna array to be used for beamforming. As the third RFIC 226 and the antenna 248 are disposed at the same substrate, it may be possible to decrease a length of a transmission line between the third RFIC 226 and the antenna 248. For example, the decrease in the transmission line may make it possible to prevent and/or reduce a signal in a high frequency band (e.g., about 6 GHz to about 60 GHz) used for the 5G network communication from being lost (or attenuated) due to the transmission line. As such, the electronic device 101 may improve the quality or speed of communication with the second cellular network 294 (e.g., a 5G network).

The second cellular network 294 (e.g., a 5G network) may be used independently of the first cellular network 292 (e.g., a legacy network) (e.g., this scheme being called "stand-alone (SA)") or may be used in a state of being connected with the first cellular network 292 (e.g., this scheme being called "non-stand alone (NSA)"). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 101 may access the access network of the 5G network and may then access an external network (e.g., Internet) under control of a core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 230 and may be accessed by another component (e.g., the processor 120, the first communication processor 212, or the second communication processor 214).

Figure 3A:
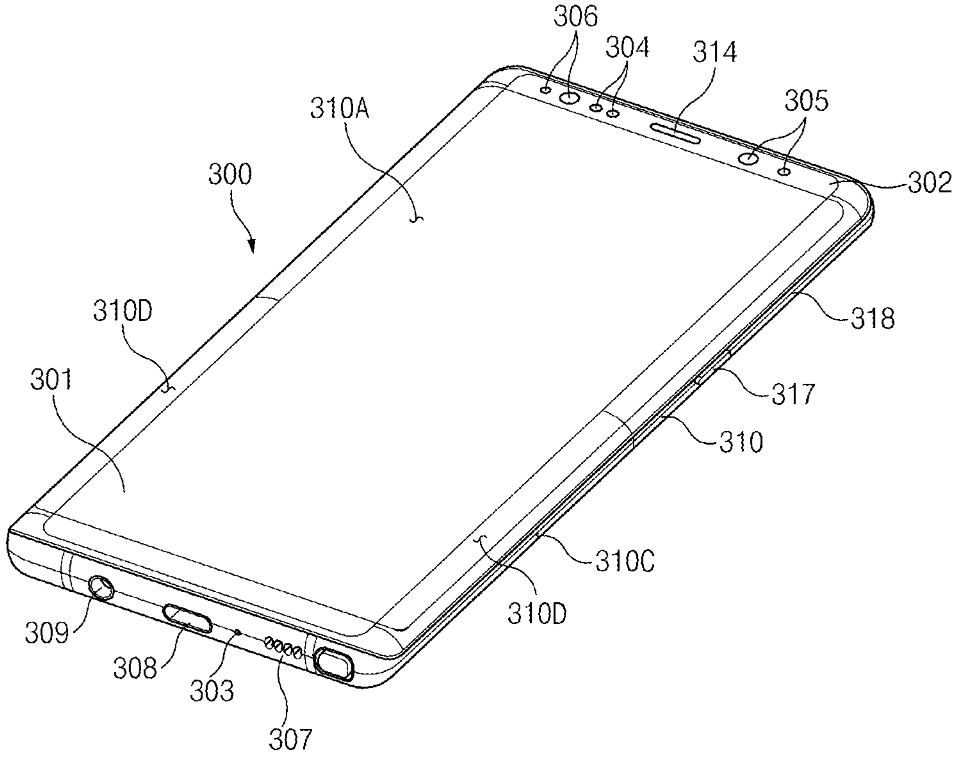
FIG. 3A is a front perspective view of an electronic device according to various embodiments.
Figure 3B:
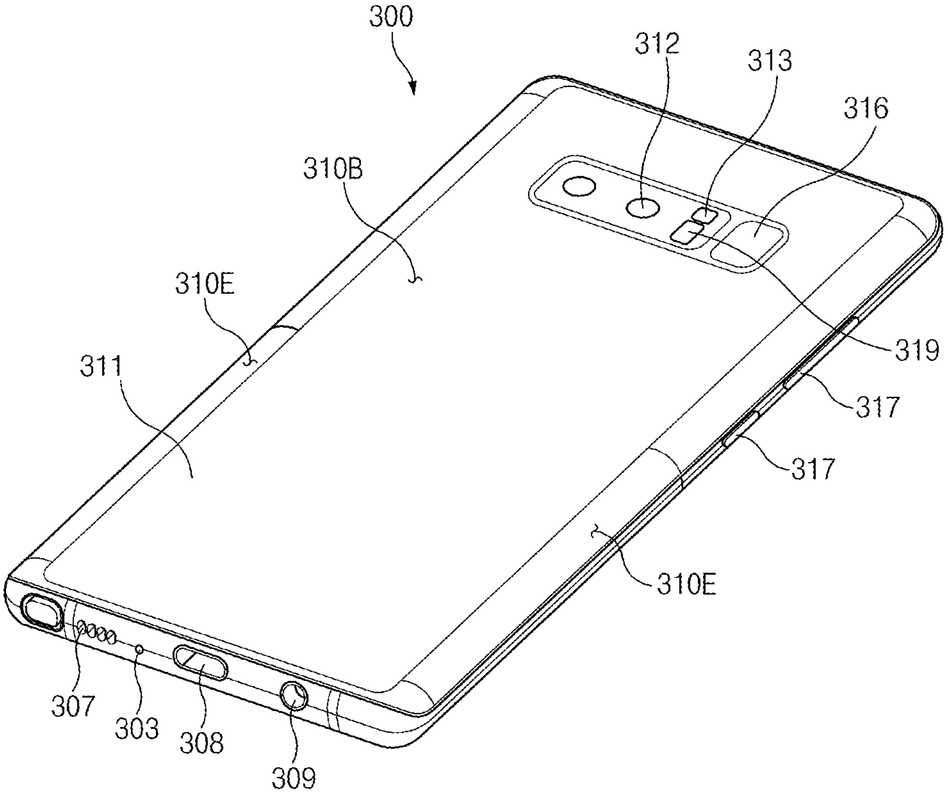
FIG. 3B is a rear perspective view of an electronic device according to various embodiments.

FIG. 3A is a front perspective view of an electronic device 300 (e.g., the electronic device 101 of FIG. 1) according to various embodiments. FIG. 3B is a rear perspective view of the electronic device 300 according to various embodiments.

Referring to FIGS. 3A and 3B, the electronic device 300 according to an embodiment may include a housing 310 including a first surface (or a front surface) 310A, a second surface (or a rear surface) 310B, and a side surface 310C surrounding a space between the first surface 310A and the second surface 310B. In an embodiment (not illustrated), the housing may refer to a structure that defines some of the first surface 310A, the second surface 310B, and the side surface 310C of FIG. 1. According to an embodiment, the first surface 310A may be defined by a front plate 302 (e.g., a glass plate or a polymer plate including various coating layers), at least a portion of which is substantially transparent. The second surface 310B may be defined by a substantially opaque rear plate 311. The rear plate 311, for example, may be formed of coated or colored glass, ceramics, a polymer, a metal (e.g., aluminum, stainless steel (STS), or magnesium), or a combination of at least two thereof. The side surface 310C may be coupled to the front plate 302 and the rear plate 311, and may be defined by a side bezel structure (or 'a side member') 318 including a metal and/or a polymer. In various embodiments, the rear plate 311 and the side bezel structure 318 may be integrally formed and may include the same material (e.g., a metallic material such as aluminum).

In the illustrated embodiment, the front plate 302 may include two first areas 310D that are deflected from the first surface 310A toward the rear plate 311 and extend seamlessly, at opposite ends of a long edge of the front plate 302. In the illustrated embodiment (see FIG. 3B), the rear plate 311 may include two second areas 310E that are deflected from the second surface 310B toward the front plate 302 and extend seamlessly, at opposite ends of a long edge of the rear plate 311. In various embodiments, the front plate 302 (or the rear plate 311) may include only one of the first areas 310D (or the second areas 310E). In other embodiments, some of the first areas 310D or the second areas 310E may not be included. In the embodiments, when viewed from a side of the electronic device 300, the side bezel structure 318 may have a first thickness (width) on a side surface, on which neither the first areas 310D nor the second areas 310E are included, and may have a second thickness that is smaller than the first thickness on a side surface, on which the first areas 310D or the second areas 310E are included.

In an embodiment, at least one antenna radiator (e.g., a conductive pattern) may be disposed in the side member (e.g., the side bezel structure 318 of FIG. 3) of the housing 310 of the electronic device 300, the two first areas 310D deflected from the first surface 310A of the front plate 302 toward the rear plate 311 and extending seamlessly, or the two second areas 310E deflected from the second surface 310B of the rear plate 311 toward the front plate 302 and extending seamlessly.

In an embodiment, at least one antenna radiator may radiate a signal of a specific frequency band. In an embodiment, at least one antenna radiator may be an auxiliary radiator. As an example, at least one antenna radiator may radiate a signal pertaining to a 5G Sub-6 frequency band of about 3.5 GHz to about 6 GHz, such as n41, n78, and/or n79. As another example, at least one antenna radiator may radiate a frequency of a Wi-Fi frequency band. The Wi-Fi frequency band may include a frequency band, such as 802.11a and/or 802.11b.

In an embodiment, at least one antenna radiator may be a main radiator. In an embodiment, some of frequency bands radiated by the main radiator and some frequency bands radiated by the auxiliary radiator may be the same, and the remaining ones thereof may be different.

In an embodiment, at least one antenna radiator may radiate a signal of a specific frequency band of mmWave. For example, the mmWave frequency band may include a frequency band, such as about 24 to about 34 GHz and/or about 37 to about 44 GHz. As another example, at least one antenna radiator may radiate a frequency of a frequency band of 11ay.

According to an embodiment, the electronic device 300 may include at least one of a display 301 (e.g., the display device 160 of FIG. 1), audio modules 303, 307, and 314 (e.g., the audio module 170 of FIG. 1), sensor modules 304, 316, and 319 (e.g., the sensor module 176 of FIG. 1), camera modules 305, 312, and 313 (e.g., the camera module 180 of FIG. 1), a key input device 317, a light emitting element 306, and connector holes 308 and 309. In various embodiments, at least one (e.g., the key input device 317 or the light emitting element 306) of the elements may be omitted from the electronic device 300 or another component may be additionally included in the electronic device 300.

The display 301, for example, may be visible through considerable portions of the front plate 302. In various embodiments, at least a portion of the display 301 may be visible through the front plate 302 defining the first surface 310A, and the first areas 310D of the side surface 310C. In various embodiments, corners of the display 301 may have a shape that is substantially the same as the adjacent outer shape of the front plate 302. In other embodiments (not illustrated), in order to expand the area, by which the display 301 is visible, the intervals between the outskirts of the display 301 and the outskirts of the front plate 302 may be substantially the same.

In other embodiments (not illustrated), a portion of the screen display area of the display 301 may have a recess or an opening, and may include at least one of the audio module 314, the sensor module 304, the camera module 305, and the light emitting element 306, which are aligned with the recess or the opening. In other embodiments (not illustrated), at least one of the audio module 314, the sensor module 304, the camera module 305, the fingerprint sensor 316, and the light emitting element 306 may be included on the rear surface of the screen display area of the display 301. In other embodiments (not illustrated), the display 301 may be coupled to or be disposed to be adjacent to a touch detection circuit, a pressure sensor that may measure the strength (the pressure) of a touch, and/or a digitizer that detects a stylus pen of a magnetic field type. In various embodiments, at least a portion of the sensor modules 304 and 319 and/or at least a portion of the key input device 317 may be disposed in the first areas 310D and/or the second areas 310E.

The audio modules 303, 307, and 314 may include the microphone hole 303 and the speaker holes 307 and 314. A microphone for acquiring external sounds may be disposed in the microphone hole 303, and in various embodiments, a plurality of microphones may be disposed to detect the direction of a sound. The speaker holes 307 and 314 may include the external speaker hole 307 and the communication receiver hole 314. In various embodiments, the speaker holes 307 and 314 and the microphone hole 303 may be implemented by one hole or a speaker may be included while the speaker holes 307 and 314 is not employed (e.g., a piezoelectric speaker).

The sensor modules 304, 316, and 319 may generate an electrical signal or a data value corresponding to an operational state of the interior of the electronic device 300 or an environmental state of the outside. The sensor modules 304, 316, and 319, for example, may include the first sensor module 304 (e.g., a proximity sensor) and a second sensor module (not illustrated) (e.g., a fingerprint sensor) disposed on the first surface 310A of the housing 310, and/or the third sensor module 319 (e.g., a HRM sensor) and/or the fourth sensor module 316 (e.g., a fingerprint sensor) disposed on the second surface 310B of the housing 310. In an embodiment, the fingerprint sensor may be disposed not only on the first surface 310A (e.g., the display 301) but also on the second surface 310B of the housing 310. The electronic device 300 may further include a sensor module (not illustrated), for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or the illumination sensor 304.

The camera modules 305, 312, and 313 may include the first camera device 305 disposed on the first surface 310A of the electronic device 300, and the second camera device 312 and/or the flash 313 disposed on the second surface 310B. The camera devices 305 and 312 may include one or a plurality of lenses, an image sensor, and/or an image signal processor. The flash 313, for example, may include a light emitting diode or a xenon lamp. In various embodiments, two or more lenses (an infrared ray camera or a wide angle/telephoto lens), and image sensors may be disposed on one surface of the electronic device 300.

The key input device 317 may be disposed on the side surface 310C of the housing 310. In an embodiment, the electronic device 300 may not include some or all of the above-mentioned key input devices 317 and the key input devices 317 which are not included, may be realized in different forms, such as a soft key, on the display 301. In various embodiments, the key input device may include the sensor module 316 disposed on the second surface 310B of the housing 310.

The light emitting element 306, for example, may be disposed on the first surface 310A of the housing 310. The light emitting element 306, for example, may provide state information on the electronic device in the form of light. In other embodiments, the light emitting element 306, for example, may provide a light source that interworks with an operation of the camera module 305. The light emitting element 306, for example, may include an LED, an IR LED, and/or a xenon lamp.

The connector holes 308 and 309 may include the first connector hole 308 that may accommodate a connector (e.g., a USB connector) for transmitting and receiving electric power and/or data to and from an external electronic device and/or the second connector hole (e.g., an earphone jack) 309 that may accommodate a connector for transmitting and receiving an audio signal to and from the external device.

Figure 4:
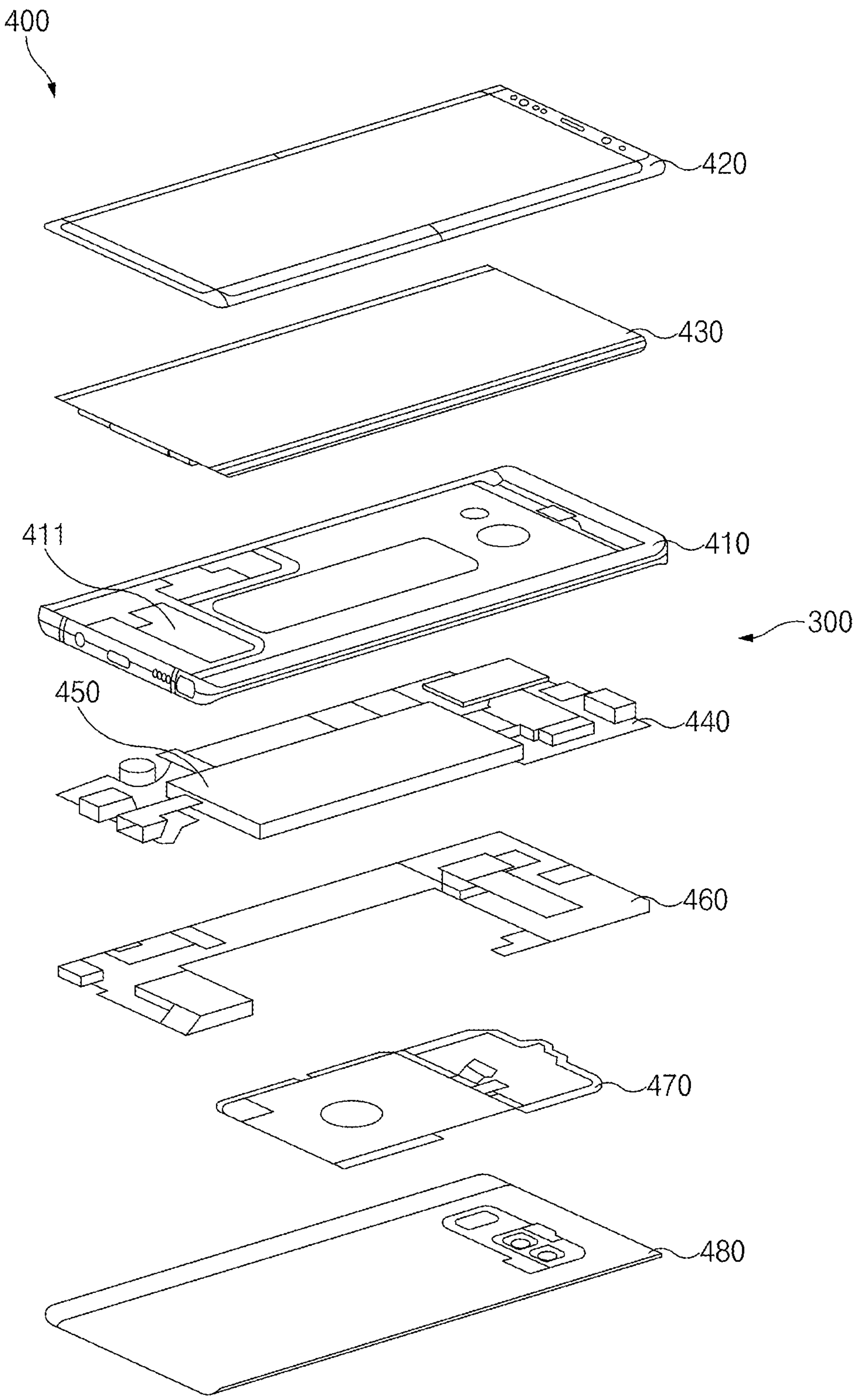
FIG. 4 is an exploded perspective view of an electronic device according to various embodiments.

FIG. 4 is an exploded perspective view 400 of an electronic device (e.g., the electronic device 300 of FIG. 3A and/or FIG. 3B) according to various embodiments. Referring to FIG. 4, the electronic device 300 may include a side bezel structure 410 (e.g., the side bezel structure 318 of FIG. 3A), a first support member 411 (e.g., the bracket), a front plate 420, a display 430 (e.g., the display 301 of FIG. 3A), a PCB 440, a battery 450, a second support member 460 (e.g., the rear case), a short range antenna 470, and/or a rear plate 480 (e.g., the rear plate 311 of FIG. 3). In various embodiments, at least one (e.g., the first support member 411 or the second support member 460) of the elements may be omitted from the electronic device 300 or another component may be additionally included in the electronic device 300. At least one of the components of the electronic device 300 may be the same as or similar to at least one of the components of the electronic device 300 of FIG. 1 or 2, and a repeated description thereof may not be provided.

The first support member 411 may be disposed in the interior of the electronic device 300 to be connected to the side bezel structure 410 or to be integrally formed with the side bezel structure 410. The first support member 411, for example, may be formed of a metallic material and/or a nonmetallic material (e.g., a polymer). The display 430 may be coupled to one surface of the first support member 411, and the PCB 440 may be coupled to an opposite surface thereof.

In an embodiment, a processor (e.g., the processor 120 of FIG. 1), a memory (e.g., the memory 130 of FIG. 1), and/or an interface (e.g., the interface 177 of FIG. 1) may be disposed on the PCB 440. The processor 120, for example, may include one or more of a central processing unit (CPU), an application processor (AP), a graphic processing unit (GPU), an image signal processor (ISP), a sensor hub processor (SHP), or a communication processor (CP). The memory, for example, may include a volatile and/or non-volatile memory. The interface, for example, may include a high definition multimedia interface (HDMI), a universal serial bus (USB) interface, an SD card interface, and/or an audio interface. The interface, for example, may electrically or physically connect the electronic device 300 to an external electronic device (e.g., the electronic device 102 or 104 of FIG. 1), and may include a USB connector, an SD card/MMC connector, or an audio connector.

The battery 450 is a device for supplying electric power to at least one component of the electronic device 300, and for example, may include a primary battery that cannot be recharged, a secondary battery that may be recharged, or a fuel cell. At least a portion of the battery 450, for example, may be disposed on the same plane as the PCB 440. The battery 450 may be integrally disposed in the interior of the electronic device 300, and may be disposed to be detachable from the electronic device 300.

The short range antenna 470 may be disposed between the rear plate 480 and the battery 450. The antenna 470, for example, may include a near field communication (NFC) antenna, a wireless charging antenna, and/or a magnetic secure transmission (MST) antenna. The antenna 470, for example, may perform short-range communication with an external device, or may wirelessly transmit and receive electric power that is necessary for charging. In an embodiment, an antenna structure may be formed by one or a combination of the side bezel structure 410 and/or the first support member 411.

Figure 5:
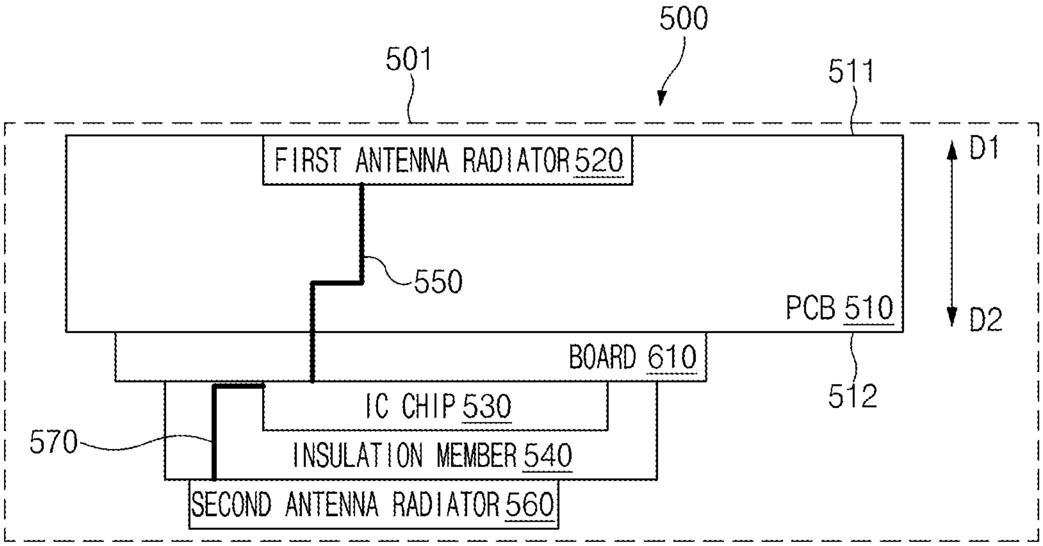
FIG. 5 is a diagram illustrating a PCB, a first antenna radiator, an IC chip, an insulation member, and a second antenna radiator of an antenna module according to various embodiments.

FIG. 5 is a diagram 500 illustrating a PCB 510, a first antenna radiator 520, an integrated circuit (IC) chip 530, an insulation member 540, and/or a second antenna radiator 560 of an antenna module 501 (e.g., the third antenna module 246 of FIG. 2) according to various embodiments. For example, the IC chip 530 may include an RFIC (e.g., the third RFIC 226 of FIG. 2).

In an embodiment, the PCB 510 may include a first surface 511 and a second surface 512. The first surface 511 may face a first direction D1. The second surface 512 may face a second direction D2. The second direction D2 may be a direction that is opposite to the first direction D1. The PCB 510 may include a plurality of metal layers and a plurality of insulation layers. The PCB 510 may include the first antenna radiator 520. The IC chip 530 may be disposed in the PCB 510. For example, a board 610, in which the IC chip 530 is disposed, may be disposed on the second surface 512 of the PCB 510. The PCB 510 may electrically connect the first antenna radiator 520 and the IC chip 530.

In an embodiment, the first antenna radiator 520 may be disposed in the first surface 511 of the PCB 510. As another example, the first antenna radiator 520 may be disposed in an interior of the PCB 510 to be closer to the first surface 511 than to the second surface 512. The first antenna radiator 520 may be connected to the IC chip 530 through a first connection part 550. The first antenna radiator 520 may receive a first signal from the IC chip 530. The first signal may have a first frequency band. In an embodiment, the first frequency band may be a frequency band of about 10 GHz to about 100 GHz. For example, the first frequency band may include a mmWave band. The first antenna radiator 520 may radiate the first signal in the first direction D1. For example, the first antenna radiator 520 may be included in an array antenna (not illustrated) (e.g., the antenna 248 of FIG. 2).

In an embodiment, the IC chip 530 may be disposed on the second surface 512 of the PCB 510. For example, the IC chip 530 may include circuit elements and conductive portions. The IC chip 530 may be electrically connected to the PCB 510. In an embodiment, the IC chip 530 may be electrically connected to the first antenna radiator 520 and/or the second antenna radiator 560. The IC chip 530 may feed the first antenna radiator 520 and/or the second antenna radiator 560. The IC chip 530 may transmit a first signal that is to be feed to the first antenna radiator 520 and/or the second antenna radiator 560.

In an embodiment, the insulation member 540 may be disposed to cover at least a portion of the IC chip 530. For example, the insulation member 540 may be formed to surround a surface of the IC chip 530, except for a surface that contacts the PCB 510. The insulation member 540 may include a nonconductive (e.g., insulating) material. For example, the insulation member 540 may include an epoxy resin. For example, the insulation member 540 may be a mold that surrounds the IC chip 530. The insulation member 540 may prevent and/or reduce the IC chip 530 from contacting the second antenna radiator 560.

In an embodiment, the first connection part 550 may electrically connect the first antenna radiator 520 and the IC chip 530. At least a portion of the first connection part 550 may be formed to pass through the PCB 510 in the first direction D1 and/or the second direction D2. For example, the first connection part 550 may include a via hole or a conductive line that passes through the PCB 510.

In an embodiment, the second antenna radiator 560 may be disposed on one surface of the insulation member 540. For example, the second antenna radiator 560 may be disposed on one surface of the insulation member 540, which faces the second direction D2. The second antenna radiator 560 may be electrically connected to the IC chip 530 through a second connection part 570. The second antenna radiator 560 may be fed from the IC chip 530. For example, the second antenna radiator 560 may be included in an array antenna (not illustrated), and the second antenna radiator 560 may form a beam pattern in the second direction D2. The second antenna radiator 560 may be disposed on one surface of the insulation member 540 such that the second antenna radiator 560 is disposed in the second direction D2, which the second surface 512 of the PCB 510, in which the IC chip 530 is disposed, faces. The antenna module 501 may enhance a radiation performance in the second direction D2 by disposing the second antenna radiator 560 in the second direction D2 of the PCB 510.

In an embodiment, the second antenna radiator 560 may receive a first signal of a first frequency band from the IC chip 530. The second antenna radiator 560 may radiate the first signal in the second direction D2. In an embodiment, the second antenna radiator 560 may radiate the first signal of the first frequency band that is the same frequency band as that of the first antenna radiator 520. As another example, the second antenna radiator 560 may radiate a second signal of a second frequency band that is different from that of the first antenna radiator 520. Accordingly, the signal of the same frequency band may implement a multi-input multi-output (MIMO) antenna module 501 that radiates the signals of the same frequency band in different directions.

In an embodiment, the second connection part 570 may electrically connect the second antenna radiator 560 and the IC chip 530. For example, at least a portion of the second connection part 570 may extend along the second surface 512 of the PCB 510. At least a portion of the second connection part 570 may be formed to pass through the insulation member 540 in the first direction D1 and/or the second direction D2. For example, the second connection part 570 may include a wire bonding or conductive line that passes through the insulation member 540.

Figure 6:
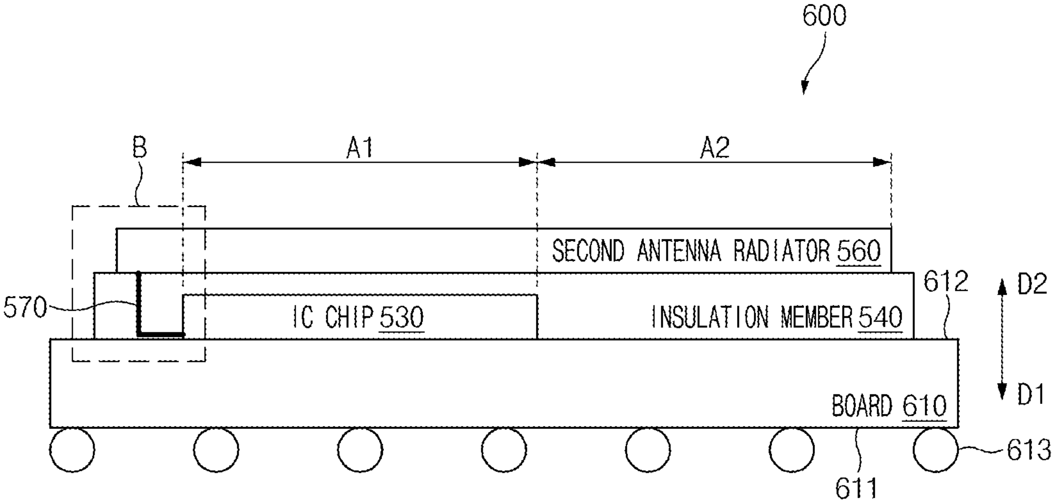
FIG. 6 is a diagram illustrating a board, an IC chip, an insulation member, a second antenna radiator, a second connection part, and a third connection part according to various embodiments.

FIG. 6 is a diagram 600 illustrating the board (substrate) 610, the IC chip 530, the insulation member 540, the second antenna radiator 560, the second connection part 570, and a third connection part 613 according to various embodiments. For example, the diagram 600 may be a view illustrating an IC chip package.

In an embodiment, the third connection part 613 may be disposed on one surface of the board 610, which faces the first direction D1. For example, the third connection part 613 may be disposed on a first surface 611 of the board 610. A plurality of third connection parts 613 may be disposed on the first surface 611 of the board 610. The third connection part 613 may be an electrical connection including a material having conductivity. For example, the third connection part 613 may be a solder ball. The third connection part 613 may electrically connect the board 610 to another PCB (e.g., the PCB 440 of FIG. 4 or the PCB 510 of FIG. 5).

In an embodiment, the IC chip 530 may be disposed on one surface of the board 610, which faces the second direction D2. For example, the IC chip 530 may be disposed on a second surface 612 of the board 610.

In an embodiment, the IC chip 530 may be disposed on a first area A1 of the board 610. For example, the first area A1 may be a fan-in area. The fan-in area may be an area, in which the IC chip 530 is disposed in a fan-out wafer level package (FOWLP). The fan-out area may be an area, in which no IC chip 530 is disposed.

In an embodiment, the insulation member 540 may cover at least a portion of the IC chip 530. For example, the insulation member 540 may cover a surface of the IC chip 530, which contacts the board 610. The insulation member 540, for example, may be a mold including a nonconductive material.

In an embodiment, the second antenna radiator 560 may be disposed on one surface of the insulation member 540. For example, the second antenna radiator 560 may be disposed on one surface of the insulation member 540, which faces the second direction D2. As another example, the second antenna radiator 560 may be disposed in the insulation member 540.

In an embodiment, the second antenna radiator 560 may be disposed in the first area A1 of the board 610 and a second area A2 of the board 610. The second area A2 may be a fan-out area. For example, the fan-out area may be an area, in which no IC chip 530 is disposed in a fan-out wafer level package (FOWLP).

In an embodiment, the second antenna radiator 560 may be disposed in the first area A1 and the second area A2. As compared with a comparative example, in which the second antenna radiator 560 may be disposed only in the second area A2, a disposition area of the second antenna radiator 560 may be increased by disposing the second antenna radiator 560 in the first area A1 and the second area A2 in the embodiment of the disclosure. A radiation performance of the second antenna radiator 560 may be enhanced by increasing the disposition area of the second antenna radiator 560.

In an embodiment, the second antenna radiator 560 may be connected to the IC chip 530 through the second connection part 570. At least a portion of the second connection part 570 may be disposed in the board 610. For example, at least a portion of the second connection part 570 may extend along the second surface 612 of the board 610. At least a portion of the second connection part 570 may be formed to pass through the insulation member 540 in the first direction D1 and/or the second direction D2. For example, at least a portion of the second connection part 570 may be formed using wire bonding.

For example, at least a portion of the second connection part 570 may extend along the second surface 612 of the board 610 in a third area "B". The third area "B" may be an area, in which the second antenna radiator 560 is disposed. At least a portion of the second connection part 570 may be formed to pass through the insulation member 540 in the first direction D1 and/or the second direction D2 in the third area "B".

Figure 7:
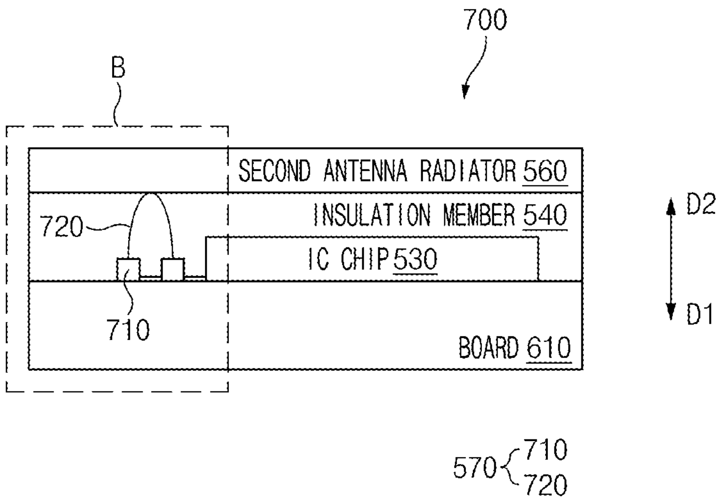
FIG. 7 is a diagram illustrating a board, an IC chip, an insulation member, a second antenna radiator, a conductive pad, and a feeding line according to various embodiments.

FIG. 7 is a diagram 700 illustrating the board (substrate) 610, the IC chip 530, the insulation member 540, the second antenna radiator 560, a conductive pad 710, and/or a feeding line 720 according to various embodiments. The second connection part 570 (e.g., the second connection part 570 of FIG. 6) may include the conductive pad 710 and/or the feeding line 720.

In an embodiment, the conductive pad 710 may be disposed on one surface (e.g., the second surface 612 of the board 610 of FIG. 6) of the board 610. For example, the conductive pad 710 may be a pattern including a conductive material. The conductive pad 710 may be disposed on the third area "B" of the board 610. The conductive pad 710 may be electrically connected to the IC chip 530. The conductive pad 710 may deliver a signal output from the IC chip 530 to the feeding line 720.

In an embodiment, the feeding line 720 may electrically connect the conductive pad 710 and the second antenna radiator 560. The feeding line 720 may be formed to pass through the insulation member 540. For example, the feeding line 720 may be connected to the second antenna radiator 560 through a method such as wire bonding.

Figure 8:
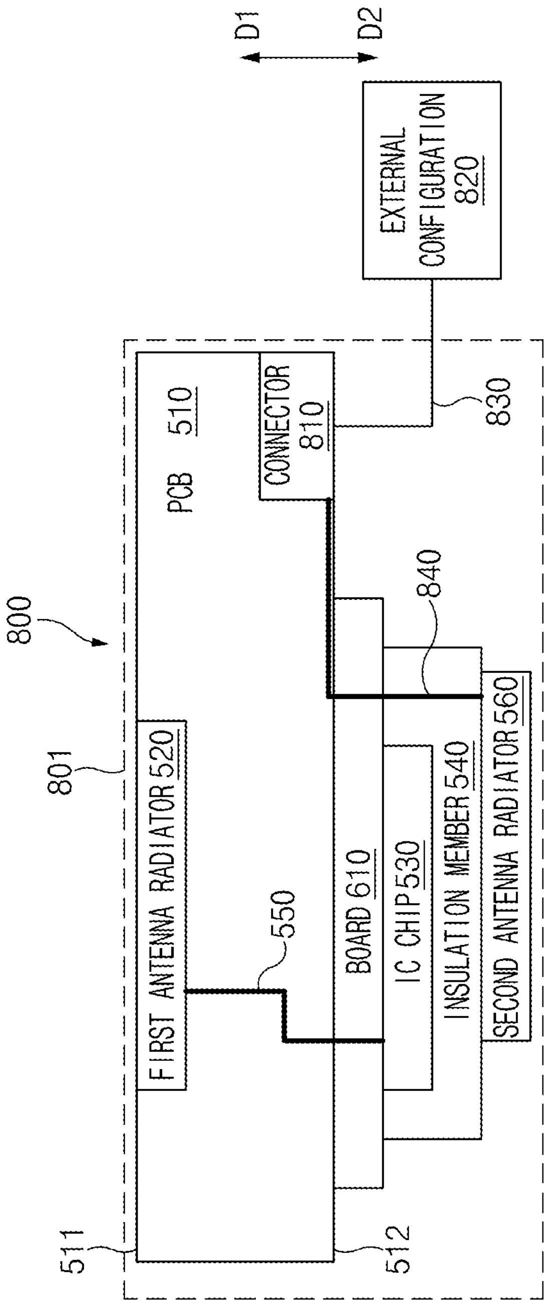
FIG. 8 is a diagram illustrating a PCB, a first antenna radiator, an IC chip, an insulation member, a second antenna radiator, and a connector of an antenna module, and an external configuration connected to the antenna module according to various embodiments.

FIG. 8 is a diagram 800 illustrating the PCB 510, the first antenna radiator 520, the IC chip 530, the insulation member 540, the second antenna radiator 560, and a connector 810 of an antenna module 801, and an external configuration 820 connected to the antenna module 801 according to various embodiments. A part of the description of the PCB 510, the first antenna radiator 520, the IC chip 530, the insulation member 540, and the second antenna radiator 560, which has been described with reference FIG. 5, may not be repeated.

In an embodiment, the PCB 510 may include the connector 810. The connector 810 may be disposed on one surface of the PCB 510. For example, the connector 810 may be disposed on the second surface 512 of the PCB 510. The connector 810 may electrically connect the PCB 510 to configurations disposed outside the PCB 510. The connector 810 may provide a signal generated outside the PCB 510 to the PCB 510.

In an embodiment, the connector 810 may be connected to the external configuration 820 (e.g., the PCB 440 of FIG. 4). For example, the external configuration 820 may be another PCB, a circuit, and/or an IC chip, which is not directly connected to the PCB 510. For example, the external configuration 820 may be a main PCB. As another example, the external configuration 820 may include a processor (e.g., the processor 120 of FIG. 1) and/or a communication module (e.g., the communication module 190 of FIG. 1). The connector 810 may be connected to the external configuration 820 through an external connection part 830. For example, the external connection part 830 may be a conductive line between the connector 810 and the external configuration 820.

In an embodiment, the second signal may be delivered to the PCB 510 through the external connection part 830 electrically connected to the external configuration 820. For example, the second signal may have a second frequency band. The second frequency band may be a frequency band that is different from the first frequency band. The second frequency band, for example, may be a frequency band of about 3 GHz to about 9 GHz. For example, the second frequency band may include an ultra wide band (UWB) or a Sub6 band (e.g., about 6 GHz or less). The external configuration 820 may deliver the second signal to the connector 810.

In an embodiment, the connector 810 may be electrically connected to the second antenna radiator 560. The second antenna radiator 560 may be connected to the connector 810 through a fourth connection part 840. For example, at least a portion of the fourth connection part 840 may extend along the second surface 512 of the PCB 510. At least a portion of the fourth connection part 840 may be formed to pass through the insulation member 540 in the first direction D1 and/or the second direction D2.

In an embodiment, when the external configuration 820 is a wireless communication circuit (e.g., the wireless communication module 192 of FIG. 2) or includes the wireless communication circuit, the external configuration 820 may feed the second antenna radiator 560. The external configuration 820 may deliver the second signal to the second antenna radiator 560 through the connector 810.

In an embodiment, the second antenna radiator 560 may radiate the second signal in the second direction D2. The second antenna radiator 560 may radiate the second signal of the second frequency band that is different from that of the first antenna radiator 520. Accordingly, the antenna module 801 having a dual band, which includes the first antenna radiator 520 and the second antenna radiator 560, may be implemented.

Figure 9:
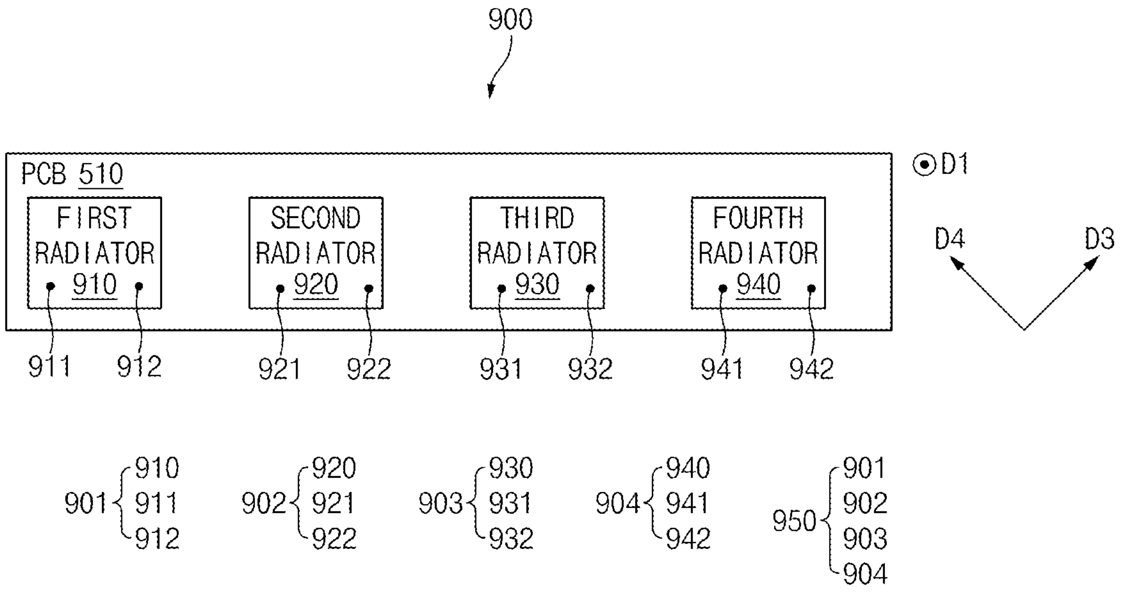
FIG. 9 is a diagram illustrating a first surface of a PCB of an antenna module according to various embodiments.

FIG. 9 is a diagram 900 illustrating a first surface (e.g., the first surface 511 of FIG. 5) of the PCB 510 of an antenna module (e.g., the antenna module 501 of FIG. 5 or the antenna module 801 of FIG. 8) according to various embodiments. A first radiator 910, a second radiator 920, a third radiator 930, and/or a fourth radiator 940 may be disposed on the first surface 511 of the PCB 510 of the antenna module 501 and 801 according to an embodiment. For example, the first radiator 910, the second radiator 920, the third radiator 930, and/or the fourth radiator 940 may be included in a first array antenna 950. In an embodiment, a radiator of the first array antenna 950 may include the first antenna radiator 520 of FIG. 5 or FIG. 8.

In an embodiment, the first array antenna 950 may include one or more antennas. Referring to FIG. 9, the first array antenna 950 may include a first antenna 901, a second antenna 902, a third antenna 903, and/or a fourth antenna 904. However, the disclosure is not limited thereto, and the number of the antennas included in the first array antenna 950 may be four or less or four or more. A radiation performance of the first array antenna 950 including the first antenna 901, the second antenna 902, the third antenna 903, and/or the fourth antenna 904 may be enhanced as compared with that of one antenna.

In an embodiment, the first antenna 901, the second antenna 902, the third antenna 903, and/or the fourth antenna 904 may be disposed side by side in a third direction D3. FIG. 9 illustrates a case, in which the first antenna 901, the second antenna 902, the third antenna 903, and/or the fourth antenna 904 are disposed in a 1 by 4 form. However, the disclosure is not limited thereto, and the first array antenna 950 may be disposed in various forms, such as 1 by 4 or 2 by 2. As another example, the first array antenna 950 may be disposed in various forms, such as 1 by 2, 1 by 3, 3 by 3, or 2 by 3, according to the number of the antennas included therein. A directivity of the first array antenna 950 in the first direction D1 may be enhanced. When the directivity of the first array antenna 950 is enhanced, a radiation performance of the first array antenna 950 in the first direction D1 may be enhanced.

In an embodiment, the first antenna 901 may include a first feeding terminal 911 and/or a second feeding terminal 912. The first feeding terminal 911 may be connected to an IC chip (e.g., the IC chip 530 of FIG. 5) through a first sub connection part (not illustrated). The first sub connection part may be included in the first connection part 550 of FIG. 5. The IC chip 530 electrically connected to the first feeding terminal 911 may transmit and/or receive a signal that is polarized in the third direction D3. For example, a signal that is fed from the IC chip 530 to the first feeding terminal 911 has a horizontal polarization, and may be transmitted from the first radiator 910. The second feeding terminal 912 may be connected to the IC chip 530 through a second sub connection part (not illustrated). The second sub connection part, for example, may be included in the first connection part 550 of FIG. 5. The IC chip 530 electrically connected to the second feeding terminal 912 may transmit and/or receive a signal that is polarized in a fourth direction D4. For example, a signal that is fed from the IC chip 530 to the second feeding terminal 912 has a vertical polarization when being transmitted.

In an embodiment, the second antenna 902 may include a third feeding terminal 921 and/or a fourth feeding terminal 922. The third feeding terminal 921 may be connected to the IC chip 530 through a third sub connection part (not illustrated). The third sub connection part may be included in the first connection part 550 of FIG. 5. The IC chip 530 electrically connected to the third feeding terminal 921 may transmit and/or receive a signal that is polarized in the third direction D3. For example, a signal that is fed from the IC chip 530 to the third feeding terminal 921 has a horizontal polarization when being transmitted. The fourth feeding terminal 922 may be connected to the IC chip 530 through a fourth sub connection part (not illustrated). The fourth sub connection part, for example, may be included in the first connection part 550 of FIG. 5. The IC chip 530 electrically connected to the fourth feeding terminal 922 may transmit and/or receive a signal that is polarized in the fourth direction D4. For example, a signal that is fed from the IC chip 530 to the fourth feeding terminal 922 has a vertical polarization when being transmitted.

In an embodiment, the third antenna 903 may include a fifth feeding terminal 931 and/or a sixth feeding terminal 932. The fifth feeding terminal 931 may be connected to the IC chip 530 through a fifth sub connection part (not illustrated). The fifth sub connection part, for example, may be included in the first connection part 550 of FIG. 5. The IC chip 530 electrically connected to the fifth feeding terminal 931 may transmit and/or receive a signal that is polarized in the third direction D3. For example, a signal that is fed from the IC chip 530 to the fifth feeding terminal 931 has a horizontal polarization when being transmitted. The sixth feeding terminal 932 may be connected to the IC chip 530 through a sixth sub connection part (not illustrated). The sixth sub connection part, for example, may be included in the first connection part 550 of FIG. 5. The IC chip 530 electrically connected to the sixth feeding terminal 932 may transmit and/or receive a signal that is polarized in the fourth direction D4. For example, a signal that is fed from the IC chip 530 to the sixth feeding terminal 932 has a vertical polarization when being transmitted.

In an embodiment, the fourth antenna 904 may include a seventh feeding terminal 941 and/or an eighth feeding terminal 942. The seventh feeding terminal 941 may be connected to the IC chip 530 through a seventh sub connection part (not illustrated). The seventh sub connection part, for example, may be included in the first connection part 550 of FIG. 5. The IC chip 530 electrically connected to the seventh feeding terminal 941 may transmit and/or receive a signal that is polarized in the third direction D3. For example, a signal that is fed from the IC chip 530 to the seventh feeding terminal 941 has a horizontal polarization when being transmitted. The eighth feeding terminal 942 may be connected to the IC chip 530 through an eighth sub connection part (not illustrated). The eighth sub connection part, for example, may be included in the first connection part 550 of FIG. 5. The IC chip 530 electrically connected to the eighth feeding terminal 942 may transmit and/or receive a signal that is polarized in the fourth direction D4. For example, a signal that is fed from the IC chip 530 to the eighth feeding terminal 942 has a vertical polarization when being transmitted.

In an embodiment, the first radiator 910, the second radiator 920, the third radiator 930, and/or the fourth radiator 940 may radiate a first signal in the first direction D1. For example, the first radiator 910, the second radiator 920, the third radiator 930, and/or the fourth radiator 940 may radiate a mmWave signal in the first direction D1.

In an embodiment, the first radiator 910, the second radiator 920, the third radiator 930, and/or the fourth radiator 940 may include a conductive patch or a conductive line.

Figure 10:
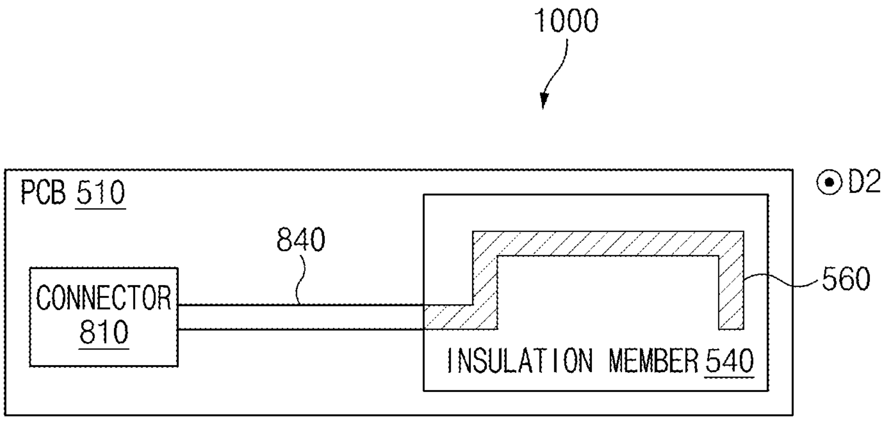
FIG. 10 is a diagram illustrating a second surface of a PCB of an antenna module according to various embodiments.

FIG. 10 is a diagram 1000 illustrating a second surface (e.g., the second surface 512 of FIG. 5) of the PCB 510 of an antenna module (e.g., the antenna module 501 of FIG. 5 or the antenna module 801 of FIG. 8) according to various embodiments. The insulation member 540, the connector 810, and/or the fourth connection part 840 may be disposed on the second surface 512 of the PCB 510 of the antenna module 501 and 801 according to an embodiment. As another example, the insulation member 540, the connector 810, and/or the fourth connection part 840 of FIG. 10 may be disposed in the second surface (e.g., the second surface 612 of FIG. 6) of the board (e.g., the board 610 of FIG. 6 and/or FIG. 7).

In an embodiment, the second antenna radiator 560 may be disposed at at least a portion of the insulation member 540. For example, the second antenna radiator 560 may be patterned on one surface of the insulation member 540, which faces the second direction D2. As another example, the second antenna radiator 560 may be patterned to have at least one bent portion on the insulation member 540.

In an embodiment, the connector 810 may receive a second signal from the external configuration 820 (e.g., the external configuration 820 of FIG. 8). The second signal delivered to the connector 810 may be delivered to the second antenna radiator 560 through the fourth connection part 840. The second antenna radiator 560 may radiate the second signal. For example, the second antenna 560 may radiate a UWB signal in the second direction D2.

Figure 11:
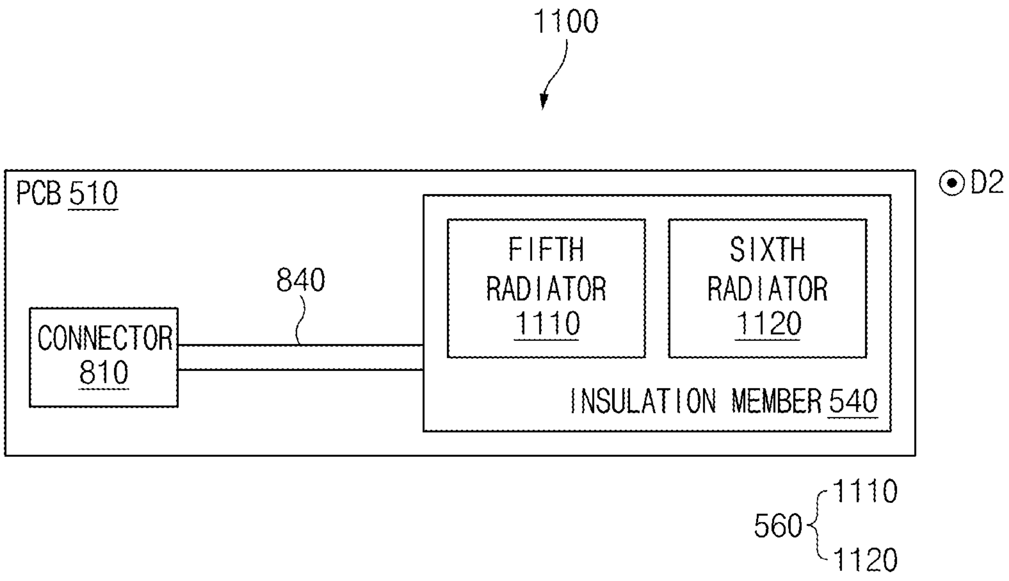
FIG. 11 is a diagram illustrating a second surface of a PCB of an antenna module according to various embodiments.

FIG. 11 is a diagram 1100 illustrating a second surface (e.g., the second surface 512 of FIG. 5) of the PCB 510 of an antenna module (e.g., the antenna module 501 of FIG. 5 or the antenna module 801 of FIG. 8) according to various embodiments. The insulation member 540, the connector 810, and/or the fourth connection part 840 may be located on the second surface 512 of the PCB 510 of the antenna module 501 and 801 according to an embodiment. As another example, the insulation member 540, and/or the fourth connection part 840 of FIG. 11 may be disposed in the second surface (e.g., the second surface 612 of FIG. 6) of the board (e.g., the board 610 of FIG. 6 and/or FIG. 7). A fifth radiator 1110 and a sixth radiator 1120 may be the second antenna radiator 560 described with reference to FIGS. 5 to 8.

In an embodiment, the fifth radiator 1110 or the sixth radiator 1120 may include at least one patch antenna element disposed on a surface of the insulation member 540, which faces the second direction D2. FIG. 11 illustrates the fifth radiator 1110 or the sixth radiator 1120 of two. However, the disclosure is not limited thereto, and two or more antenna elements may be included.

In an embodiment, the fifth radiator 1110 or the sixth radiator 1120 may receive the second signal through the fourth connection part 840. The fifth radiator 1110 or the sixth radiator 1120 may radiate the second signal in the second direction D2. The fifth radiator 1110 or the sixth radiator 1120 may form an array antenna.

Figure 12:
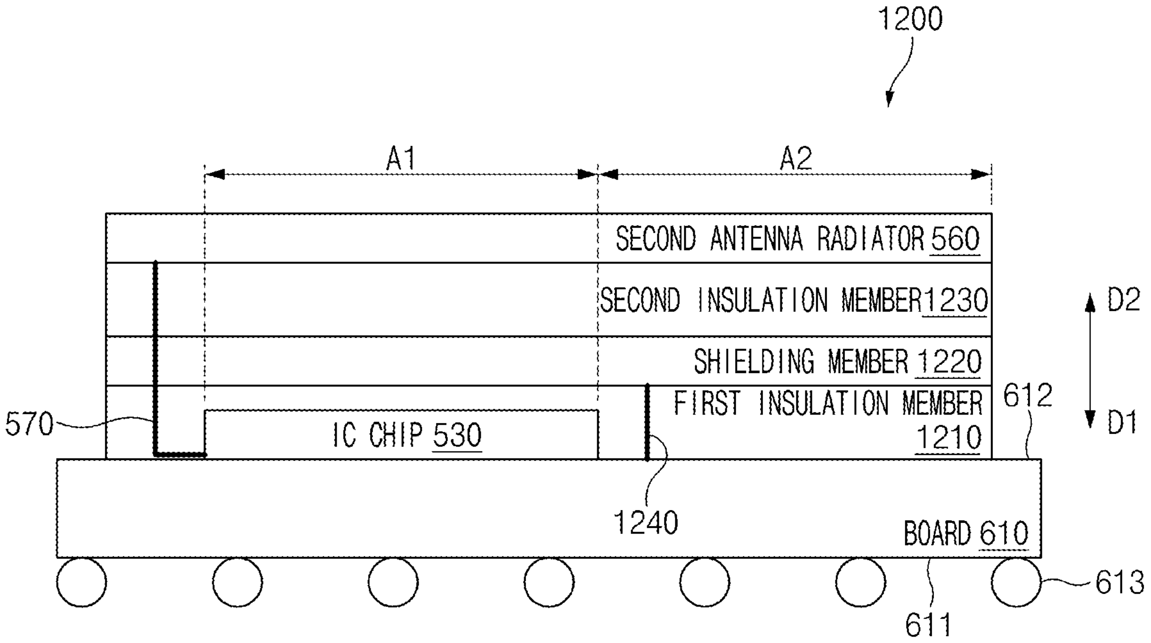
FIG. 12 is a diagram illustrating a board, an IC chip, a first insulation member, a shielding member, a second insulation member, a second antenna radiator, a second connection part, a third connection part, and a fifth connection part according to various embodiments.

FIG. 12 is a diagram 1200 illustrating the board 610, the IC chip 530, a first insulation member 1210, a shielding member 1220, a second insulation member 1230, the second antenna radiator 560, the second connection part 570, the third connection part 613, and/or a fifth connection part 1240 according to various embodiments. A part of the description of the IC chip 530, the second antenna radiator 560, and the second connection part 570, which has been made with reference to FIG. 5, may not be repeated. Furthermore, a part of the description of the board 610 and the third connection part 613, which has been made with reference to FIG. 6, may not be repeated.

In an embodiment, the first insulation member 1210 may cover at least a portion of the IC chip 530. For example, the first insulation member 1210 may cover a surface of the IC chip 530, which contacts the board 610. The first insulation member 1210 may be disposed in a first area A1, in which the IC chip 530 is disposed, and a second area A2 that is an area except for the first area A1. The first insulation member 1210, for example, may include a nonconductive material, such as an epoxy resin. For example, the first insulation member 1210 may be a mold that surrounds at least a portion of the IC chip 530.

In an embodiment, the shielding member 1220 may be disposed on one surface of the first insulation member 1210. For example, the shielding member 1220 may be disposed on one surface of the first insulation member 1210, which faces the second direction D2. The shielding member 1220 may be disposed in the first area A1 and the second area A2. The shielding member 1220 may include a conductive material.

In an embodiment, the shielding member 1220 may be connected to the board 610. The shielding member 1220 may be connected to the board 610 through the fifth connection part 1240. For example, the shielding member 1220 may be electrically connected to a ground layer of the PCB 610.

In an embodiment, the shielding member 1220 may emit heat generated by the IC chip 530. The shielding member 1220 may disperse the heat generated by the IC chip 530 and emit the heat to an outside. The shielding member 1220 may emit the heat generated by the IC chip 530 to a metal layer of the PCB 610 through the fifth connection part 1240. The shielding member 1220 may form a heat dissipating structure for the IC chip 530.

In an embodiment, the shielding member 1220 may interrupt electro-magnetic interferences (EMIs) generated by the IC chip 530. The shielding member 1220 may absorb electromagnetic waves generated by the IC chip 530. The shielding member 1220 may reduce a rate, at which the electromagnetic waves generated by the IC chip 530 are discharged to the outside. The shielding member 1220 may be disposed between the first insulation member 1210 and the second insulation member 1230.

In an embodiment, the second insulation member 1230 may cover at least a portion of the shielding member 1220. For example, the second insulation member 1230 may be disposed on one surface of the shielding member 1220, which faces the second direction D2. The second insulation member 1230 may be disposed in the first area A1 and the second area A2. The second insulation member 1230, for example, may include a nonconductive material, such as an epoxy resin. For example, the second insulation member 1230 may be a mold that surrounds the shielding member 1220.

In an embodiment, the second antenna radiator 560 may be disposed in the second insulation member 1230. For example, the second antenna radiator 560 may be disposed on one surface of the second insulation member 1230, which faces the second direction D2. The second antenna radiator 560 may be electrically connected to the IC chip 530 through the second connection part 570. The second antenna radiator 560 may be fed from the IC chip 530. The second antenna radiator 560 may radiate a signal in the second direction D2. The second antenna radiator 560 may be disposed on one surface of the second insulation member 1230 such that the second antenna radiator 560 is disposed in the second direction D2 of the board 610, in which the IC chip 530 is disposed. The radiation performance in the second direction D2 may be enhanced by disposing the second antenna radiator 560 in the second direction D2 of the board 610.

In an embodiment, the second antenna radiator 560 may receive a first signal of a first frequency band from the IC chip 530. For example, the second antenna radiator 560 may radiate the first signal in the second direction D2.

In an embodiment, the second connection part 570 may electrically connect the second antenna radiator 560 and the IC chip 530. For example, at least a portion of the second connection part 570 may extend along the second surface 612 of the board 610. At least a portion of the second connection part 570 may be formed to pass through the first insulation member 1210, the shielding member 1220, and/or the second insulation member 1230 in the first direction D1 and/or the second direction D2. For example, the second connection part 570 may include a via hole that passes through the first insulation member 1210, the shielding member 1220, and the second insulation member 1230, or a wire bonding or conductive line.

In an embodiment, the fifth connection part 1240 may electrically connect the shielding member 1220 and the board 610. At least a portion of the fifth connection part 1240 may be formed to pass through the first insulation member 1210 in the first direction D1 and/or the second direction D2. The fifth connection part 1240 may be a via hole that passes through the first insulation member 1210, or a wire bonding or conductive line.

Figure 13:
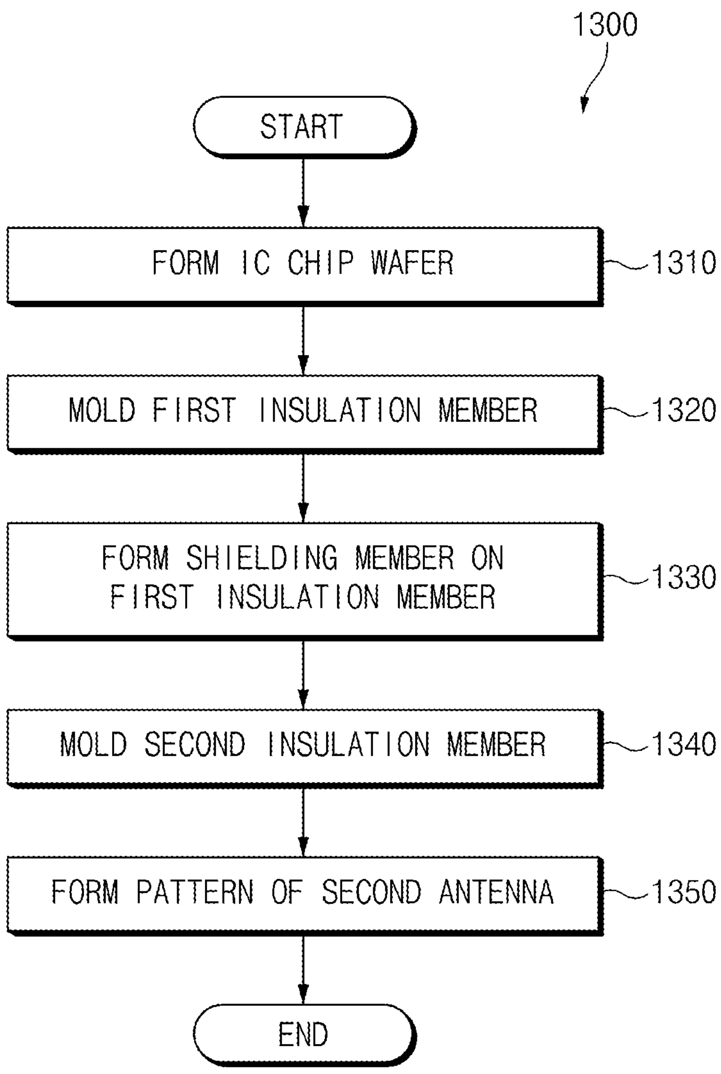
FIG. 13 is a flowchart illustrating an example operation of manufacturing an antenna according to various embodiments.

FIG. 13 is a flowchart 1300 illustrating an example operation of manufacturing an antenna according to various embodiments.

According to an embodiment, in operation 1310, a wafer of the IC chip (e.g., the IC chip 530 of FIG. 12) may be formed. The wafer of the IC chip 530 may include a plurality of metal layers for forming a circuit and metal patterns included in the IC chip 530. The wafer of the IC chip 530 may be etched to form the circuit and the metal patterns.

According to an embodiment, in operation 1320, the first insulation member (e.g., the first insulation member 1210 of FIG. 12) may be molded. For example, the first insulation member 1210 may be molded to cover at least a portion of the IC chip 530. The first insulation member 1210 may cover a surface of the IC chip 530, except for a surface that contacts the board (e.g., the board 610 of FIG. 12).

According to an embodiment, in operation 1330, the shielding member (e.g., the shielding member 1220 of FIG. 12) may be formed on the first insulation member 1210. The shielding member 1220 may be formed on one surface of the first insulation member 1210. For example, the shielding member 1220 may be formed in a ground conformal shielding scheme.

According to an embodiment, in operation 1340, the second insulation member (e.g., the second insulation member 1230 of FIG. 12) may be molded. The second insulation member 1230 may be molded to cover at least a portion of the shielding member 1220. For example, the second insulation member 1230 may cover a surface of the shielding member 1220, which contacts the first insulation member 1210.

According to an embodiment, in operation 1350, a pattern of the second antenna (e.g., the second antenna radiator 560 of FIG. 12) may be formed. The second antenna radiator 560 may be disposed in the second insulation member 1230. For example, the second antenna radiator 560 may be formed to radiate a signal in the second direction (e.g., the second direction D2 of FIG. 12).

Figure 14:
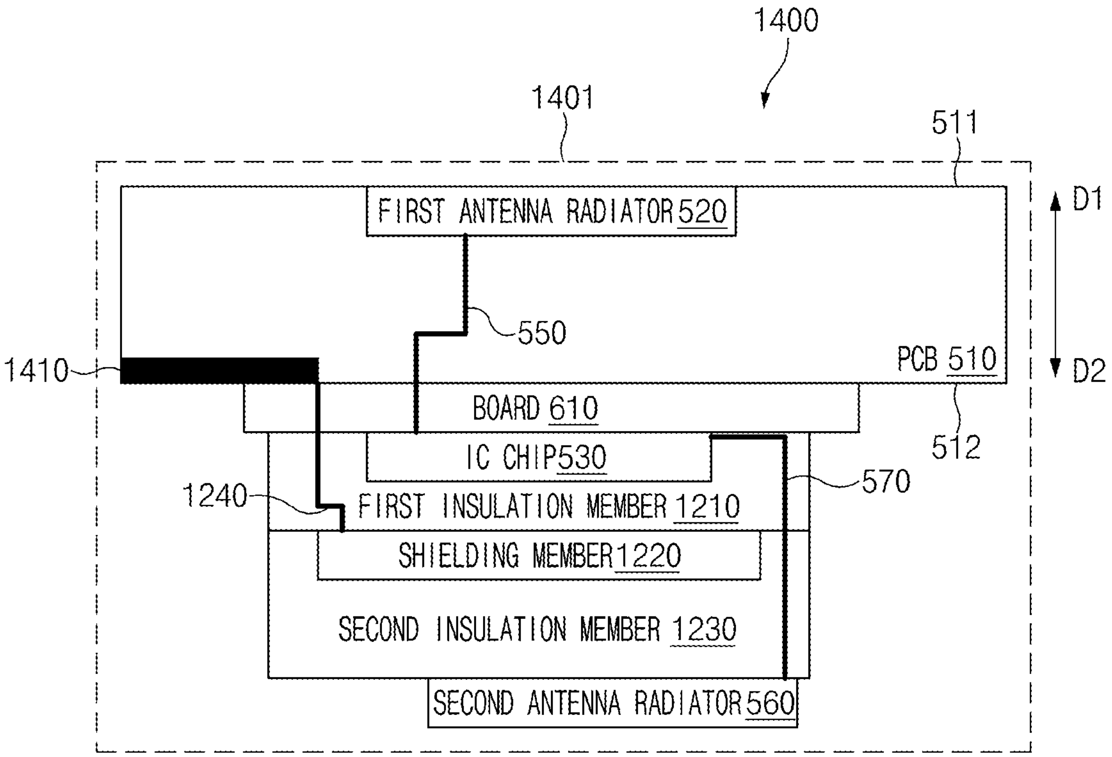
FIG. 14 is a diagram illustrating a PCB, a first antenna radiator, an IC chip, a first insulation member, a shielding member, a second insulation member, and a second antenna radiator of an antenna module according to various embodiments.

FIG. 14 is a diagram 1400 illustrating the PCB 510, the first antenna radiator 520, the IC chip 530, the first insulation member 1210, the shielding member 1220, the second insulation member 1230, and/or the second antenna radiator 560 of an antenna module 1401 according to various embodiments. A part of the description of the PCB 510, the first antenna radiator 520, the IC chip 530, and the second antenna radiator 560, which has been described with reference FIG. 5, may not be repeated. Furthermore, a part of the description of the second connection part 570, the first insulation member 1210, the shielding member 1220, and the second insulation member 1230, which has been described with reference to FIG. 12, may not be repeated.

In an embodiment, the second antenna radiator 560 may radiator the first signal of the first frequency band that is the same frequency band as that of the first antenna radiator 520. Accordingly, the signal of the same frequency band may implement an MIMO antenna module 501 that radiates the signals of the same frequency band in different directions.

In an embodiment, the shielding member 1220 may be connected to the PCB 510. The shielding member 1220 may be connected to the PCB 510 through the fifth connection part 1240. At least a portion of the fifth connection part 1240 may be formed to pass through the first insulation member 1210 in the first direction D1 and/or the second direction D2.

In an embodiment, the fifth connection part 1240 may be connected to a metal layer 1410 of the PCB 510. The metal layer 1410 may be any one of the plurality of metal layers included in the PCB 510. The metal layer 1410 may be exposed in at least a partial area of the second surface 512. For example, the metal layer 1410 may be exposed through the second surface 512 of the PCB 510 by opening at least a partial area of the second surface 512 of the PCB 510. For example, the metal layer 1410 may be a ground of the PCB 510.

In an embodiment, the metal layer 1410 may contact at least a portion of a side member (e.g., the side bezel structure 318 of FIG. 3A) or at least a portion of the support member (e.g., the first support member 411 of FIG. 4). For example, the metal layer 1410 may contact a metallic portion of the side member 318 or a metallic portion of the support member 411 using a conductive connection member.

In an embodiment, the shielding member 1220 may absorb heat generated by the IC chip 530. The shielding member 1220 may deliver absorbed heat to at least a portion of the side member 318 or at least a portion of the support member 411 through the fifth connection part 1240 or the metal layer 1410. The shielding member 1220 may emit the absorbed heat through at least a portion of the side member 318 or at least a portion of the support member 411. The shielding member 1220, the fifth connection part 1240, and the metal layer 1410 may form a heat dissipating structure that dissipates the heat generated by the IC chip 530.

In an embodiment, the shielding member 1220 may shield EMIs generated by the IC chip 530.

Figure 15:
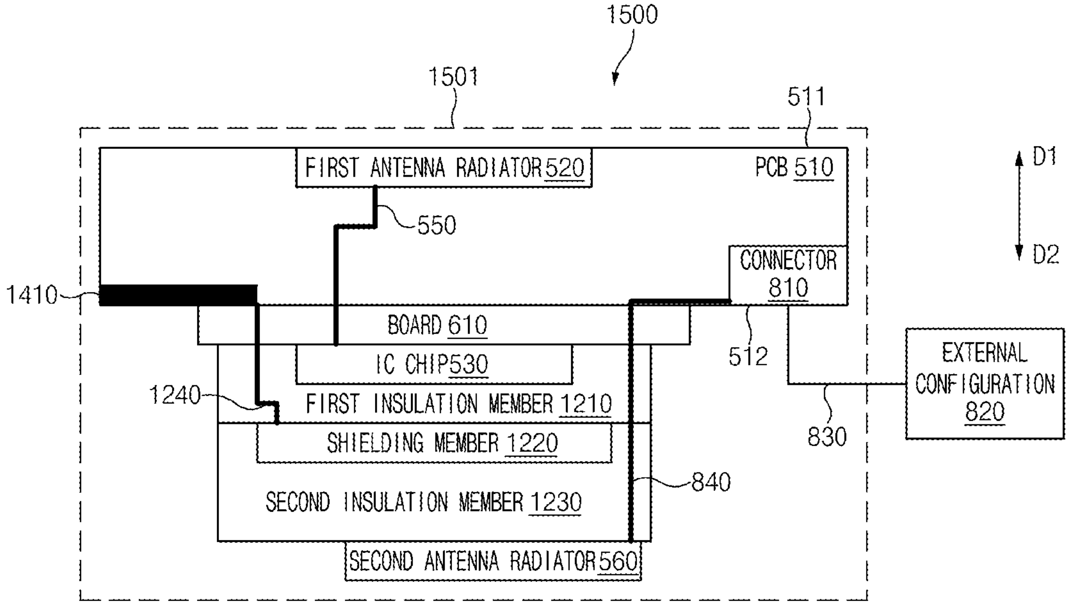
FIG. 15 is a diagram illustrating a PCB, a first antenna radiator, an IC chip, a first insulation member, a shielding member, a second insulation member, a second antenna radiator, and a connector of an antenna module, and an external configuration connected to an antenna module according to various embodiments.

FIG. 15 is a diagram illustrating the PCB 510, the first antenna radiator 520, the IC chip 530, the first insulation member 1210, the shielding member 1220, the second insulation member 1230, the second antenna radiator 560, the connector 810 of an antenna module and/or the external configuration 820 connected to the antenna module 1501 according to various embodiments. A part of the description of the PCB 510, the first antenna radiator 520, the IC chip 530, and the second antenna radiator 560, which has been described with reference FIG. 5, may not be repeated. Furthermore, a part of the description of the connector 810 and the external configuration 820, which has been made with reference to FIG. 8, may not be repeated. Furthermore, a part of the description of the first insulation member 1210, the shielding member 1220, and the second insulation member 1230, which has been described with reference to FIG. 12, may not be repeated.

In an embodiment, the connector 810 may be disposed on the second surface 512 of the PCB 510. The connector 810 may electrically connect the PCB 510 to configurations disposed outside the PCB 510. The connector 810 may provide a signal generated outside the PCB 510 to the PCB 510.

In an embodiment, the connector 810 may be electrically connected to the external configuration 820 through an external connection part 830. For example, the external connection part 830 may be a conductive line between the connector 810 and the external configuration 820.

In an embodiment, the connector 810 may be electrically connected to the second antenna radiator 560. The second antenna radiator 560 may be connected to the connector 810 through a fourth connection part 840. At least a portion of the fourth connection part 840 may extend along the second surface 512 of the PCB 510. At least a portion of the fourth connection part 840 may be formed to pass through the first insulation member 1210 and the second insulation member 1230 in the first direction D1 and/or the second direction D2.

In an embodiment, a wireless communication circuit electrically connected to the external configuration 820 may feed the second antenna radiator 560. The wireless communication circuit may deliver the second signal to the second antenna radiator 560 through the connector 810.

In an embodiment, the second antenna radiator 560 may radiate the second signal in the second direction D2. The second antenna radiator 560 may radiate the second signal of the second frequency band that is different from that of the first antenna radiator 520. For example, the antenna module 1501 having a dual band, which includes the first antenna radiator 520 and the second antenna radiator 560, may be implemented.

In an embodiment, the first antenna radiator 520 may be included in an array antenna (e.g., the first array antenna 950 of FIG. 9). The second antenna radiator 560 may be included in a single antenna (e.g., the second antenna 560 of FIG. 10). However, the disclosure is not limited thereto, and the first antenna radiator 520 may be included in a single antenna and the second antenna radiator 560 may be included in an array antenna.

An electronic device (e.g., the electronic device 101 of FIG. 1) according to various example embodiments includes: a housing (e.g., the housing 310 of FIG. 3A) including a front plate (e.g., the front plate 302 of FIG. 3A), a rear plate (e.g., the rear plate 311 of FIG. 3B), and a side portion (e.g., the side bezel structure 318 of FIG. 3A) surrounding a space defined by the front plate and the rear plate, a display (e.g., the display 301 of FIG. 3A) visible through the front plate, and an antenna module (e.g., the antenna module 501 of FIG. 5) disposed in the space, the antenna module includes a printed circuit board (PCB) (e.g., the PCB 510 of FIG. 5) including a first surface (e.g., the first surface 511 of FIG. 5) facing a first direction (e.g., the first direction D1 of FIG. 5) and a second surface (e.g., the second surface 512 of FIG. 5) facing a second direction (e.g., the second direction D2 of FIG. 5) opposite to the first direction, at least one first antenna (e.g., the first antenna radiator 520 of FIG. 5) disposed on the first surface of the PCB, an IC chip (e.g., the IC chip 530 of FIG. 5) disposed on the second surface of the PCB, an insulation member comprising an insulating material (e.g., the insulation member 540 of FIG. 5) covering at least a portion of the IC chip, and a second antenna (e.g., the second antenna radiator 560 of FIG. 5) disposed on a surface of the insulation member, facing the second direction. The IC chip may be configured to feed the first antenna, the first antenna may be configured to radiate a first signal of a first frequency band, and the second antenna may be configured to radiate a second signal.

In an example embodiment, the IC chip may be configured to feed the second antenna, and the second signal may have the first frequency band.

In an example embodiment, the electronic device may further include a board (e.g., the board 610 of FIG. 5) disposed on one surface of the PCB, and the IC chip may be disposed on a surface of the board.

In an example embodiment, the PCB may further include a connector (e.g., the connector 810 of FIG. 8) connected to an external configuration (e.g., the external configuration 820 of FIG. 8), the connector may be connected to the second antenna, the external configuration may be configured feed the second antenna, and the second signal may have a second frequency band different from the first frequency band.

In an example embodiment, the IC chip may be disposed in a first area (e.g., the first area A1 of FIG. 6) including a fan-in area of the board, and the second antenna may be disposed in the first area of the board, and a second area (e.g., the second area A2 of FIG. 6) including a fan-out area of the board.

In an example embodiment, the IC chip and the second antenna may be connected to each other through a conductive pad (e.g., the conductive pad 710 of FIG. 7) disposed in a third area (e.g., the third area "B" of FIG. 7) of the board, and a feeding line (e.g., the feeding line 720 of FIG. 7).

In an example embodiment, the first antenna includes at least one radiator (e.g., the first radiator 910, the second radiator 920, the third radiator 930, and/or the fourth radiator 940 of FIG. 9), the at least one radiator may include a first feeding terminal (e.g., the first feeding terminal 911 of FIG. 9), to which a signal in a third direction (e.g., the third direction D3 of FIG. 9) is configured to be fed, and a second feeding terminal (e.g., the second feeding terminal 912 of FIG. 9), to which a signal of a fourth direction (e.g., the fourth direction D4 of FIG. 9) perpendicular to the third direction is configured to be fed.

In an example embodiment, the second antenna may be patterned on at least a portion of the insulation member.

An electronic device according to various example embodiments includes: a housing including a front plate 302*a* rear plate, and a side portion, a display visible through the front plate, a support (e.g., the first support member 411 of FIG. 4) connected to the side portion of the housing, and an antenna module (e.g., the antenna module 1401 of FIG. 14) disposed in the side portion and/or the support, the antenna module includes a printed circuit board (PCB) including a first surface facing a first direction and a second surface facing a second direction opposite to the first direction, at least one first antenna disposed on the first surface of the PCB, an IC chip disposed on the second surface of the PCB, a first insulation member comprising an insulating material (e.g., the first insulation member 1210 of FIG. 14) covering the IC chip, a shielding member comprising a conductive material (e.g., the shielding member 1220 of FIG. 14) disposed on one surface of the first insulation member facing the second direction, and having a conductivity, a second insulation member comprising an insulating material (e.g., the second insulation member 1230 of FIG. 14) covering the shielding member, and a second antenna disposed on a surface of the second insulation member facing the second direction. The IC chip may be configured to feed the first antenna, the first antenna may configured to radiate a first signal of a first frequency band, and the second antenna may be configured to radiate a second signal.

In an example embodiment, the electronic device may further include a first connection part (e.g., the first connection part 550 FIG. 5) electrically connecting the first antenna and the IC chip, and at least a portion of the first connection part may be formed to pass through the PCB in the first direction and/or the second direction.

In an example embodiment, the electronic device may further include a second connection part (e.g., the second connection part 570 FIG. 14) electrically connecting the second antenna and the IC chip, and at least a portion of the second connection part may be formed to pass through the first insulation member, the shielding member, and the second insulation member in the first direction and/or the second direction.

In an example embodiment, the electronic device may further include a board disposed on the second surface of the PCB, and a third connection part (e.g., the third connection part 613 of FIG. 6) disposed on a first surface (e.g., the first surface 611 of FIG. 6) of the board, wherein the third connection part may electrically connect the PCB and the board.

In an example embodiment, the electronic device may further include a connector connecting the PCB and an external configuration, and a fourth connection part (e.g., the fourth connection part 830 of FIG. 8) connecting the connector to the second antenna, wherein the PCB may be configured to receive the second signal having a second frequency band from the external configuration to the second antenna through the fourth connection part.

In an example embodiment, the PCB 510 may include a plurality of insulation layers and a plurality of metal layers, one (e.g., the metal layer 1410 of FIG. 14) of the metal layers being exposed in at least a partial area of the second surface of the PCB, the shielding member and the exposed metal layer may be connected to a fifth connection part (e.g., the fifth connection part 1240 of FIG. 14) that passes through the first insulation member, and the exposed metal layer may connect at least a portion of the side portion or at least a portion of the support.

In an example embodiment, the exposed metal layer may contact a metallic portion of the side portion or a metallic portion of the support.

The antenna module according to various example embodiments may include: a printed circuit board (PCB) including a first surface facing a first direction and a second surface facing a second direction opposite to the first direction, at least one first antenna disposed on the first surface of the PCB, an IC chip disposed on the second surface of the PCB, an insulation member comprising an insulating material covering the IC chip, and a second antenna disposed on a surface of the insulation member facing the second direction. The IC chip may be configured to feed the first antenna, the first antenna may be configured to radiate a first signal of a first frequency band, and the second antenna radiator may be configured to radiate the second signal.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a housing including a front plate, a rear plate, and a side portion surrounding a space defined by the front plate and the rear plate;

a display disposed under the front plate; and an antenna module disposed in the space, wherein the antenna module includes:

a printed circuit board (PCB) including a first surface facing a first direction and a second surface facing a second direction opposite to the first direction;

at least one first antenna disposed on the first surface of the PCB;

an IC chip disposed on the second surface of the PCB;

an insulation member comprising an insulating material and formed on a surface of the IC chip, facing the second direction; and a second antenna disposed on one surface of the insulation member, facing the second direction, wherein the IC chip is configured to feed the first antenna, wherein the first antenna is configured to radiate a first signal of a first frequency band, and wherein the second antenna is configured to radiate a second signal.

2. The electronic device of claim 1, wherein the IC chip is configured to feed electric power to the second antenna, and wherein the second signal is of the first frequency band.

3. The electronic device of claim 1, further comprising:

a board disposed on the second surface of the PCB, wherein the IC chip is disposed on a surface of the board.

4. The electronic device of claim 3, wherein the IC chip is disposed in a first area including a fan-in area of the board, and wherein the second antenna is disposed in the first area of the board, and a second area including a fan-out area of the board.

5. The electronic device of claim 4, wherein the IC chip and the second antenna are connected to each other through a conductive pad disposed in a third area of the board, and a feeding line.

6. The electronic device of claim 1, wherein the PCB further includes a connector connected to an external configuration, wherein the connector is connected to the second antenna, wherein the external configuration is configured to feed electric power to the second antenna, and wherein the second signal is of a second frequency band different from the first frequency band.

7. The electronic device of claim 1, wherein the first antenna includes at least one radiator, wherein the at least one radiator includes:

a first feeding terminal, to which a signal of a third direction is configured to be fed; and a second feeding terminal, to which a signal of a fourth direction perpendicular to the third direction is configured to be fed.

8. The electronic device of claim 1, wherein the second antenna is patterned on at least a portion of the insulation member.

9. The electronic device of claim 1, wherein the insulation member is formed on side surfaces of the IC chip and a portion of the second surface of the PCB.

10. An electronic device comprising:
a housing including a front plate, a rear plate, and a side portion;
a display disposed under the front plate;
a support connected to the side portion of the housing; and
an antenna module disposed in the side portion and/or the support,
wherein the antenna module includes:
a printed circuit board (PCB) including a first surface facing a first direction and a second surface facing a second direction opposite to the first direction;
at least one first antenna disposed on the first surface of the PCB;
an IC chip disposed on the second surface of the PCB;
a first insulation member comprising an insulating material and formed on a surface of the IC chip, facing the second direction;
a shield comprising a conductive material disposed on one surface of the first insulation member facing the second direction, and having a conductivity;
a second insulation member comprising an insulating material covering the shield; and
a second antenna disposed on a surface of the second insulation member facing the second direction,
wherein the IC chip is configured to feed to the first antenna,
wherein the first antenna is configured to radiate a first signal of a first frequency band, and
wherein the second antenna is configured to radiate a second signal.

11. The electronic device of claim 10, further comprising:
a connection part electrically connecting the first antenna and the IC chip,
wherein at least a portion of the connection part passes through the PCB in the first direction and/or the second direction.

12. The electronic device of claim 10, further comprising:
a connection part electrically connecting the second antenna and the IC chip,
wherein at least a portion of the connection part passes through the first insulation member, the shield, and the second insulation member in the first direction and/or the second direction.

13. The electronic device of claim 10, further comprising:
a board disposed on the second surface of the PCB; and
a connection part disposed on a first surface of the board,
wherein the connection part electrically connects the PCB and the board.

14. The electronic device of claim 10, further comprising:
a connector connecting the PCB and an external configuration; and
a connection part connecting the connector to the second antenna,
wherein the PCB is configured to receive the second signal of a second frequency band from the external configuration to the second antenna through the connection part.

15. The electronic device of claim 10, wherein the PCB includes a plurality of insulation layers and a plurality of metal layers,
wherein one of the metal layers is exposed in at least a partial area of the second surface of the PCB,
wherein the shield and the exposed metal layer are connected to a connection part that passes through the first insulation member, and
wherein the exposed metal layer connects at least a portion of the side portion or at least a portion of the support.

16. The electronic device of claim 15, wherein the exposed metal layer contacts a metallic portion of the side portion or a metallic portion of the support.

17. An antenna module comprising:
a printed circuit board (PCB) including a first surface facing a first direction and a second surface facing a second direction opposite to the first direction;
at least one first antenna disposed on the first surface of the PCB;
an IC chip disposed on the second surface of the PCB;
an insulation member comprising an insulating material and formed on a surface of the IC chip, facing the second direction; and
a second antenna disposed on a surface of the insulation member, facing the second direction,
wherein the IC chip is configured to feed the first antenna,
wherein the first antenna is configured to radiate a first signal of a first frequency band, and
wherein the second antenna is configured to radiate a second signal.

18. The antenna module of claim 17, wherein the IC chip is configured to feed electric power to the second antenna, and
wherein the second signal is of the first frequency band.

19. The antenna module of claim 18, further comprising:
a board disposed on the second surface of the PCB,
wherein the IC chip is disposed on a surface of the board.

20. The antenna module of claim 17, wherein the IC chip is disposed in a first area including a fan-in area of the PCB, and
wherein the second antenna is disposed in the first area of the PCB, and a second area including a fan-out area of the PCB.

21. The antenna module of claim 20, wherein the IC chip and the second antenna are connected to each other through a conductive pad disposed in a third area of the PCB, and a feeding line.

* * * * *